United States Patent
Go et al.

(10) Patent No.: US 12,490,256 B2
(45) Date of Patent: Dec. 2, 2025

(54) METHOD AND DEVICE FOR TRANSMITTING OR RECEIVING PUSCH IN WIRELESS COMMUNICATION SYSTEM

(71) Applicant: LG ELECTRONICS INC., Seoul (KR)

(72) Inventors: Seongwon Go, Seoul (KR); Hyungtae Kim, Seoul (KR); Jiwon Kang, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 343 days.

(21) Appl. No.: 17/908,207

(22) PCT Filed: Mar. 15, 2021

(86) PCT No.: PCT/KR2021/003136
§ 371 (c)(1),
(2) Date: Aug. 30, 2022

(87) PCT Pub. No.: WO2021/187823
PCT Pub. Date: Sep. 23, 2021

(65) Prior Publication Data
US 2023/0118905 A1    Apr. 20, 2023

(30) Foreign Application Priority Data

Mar. 16, 2020 (KR) .................. 10-2020-0031814
Oct. 15, 2020 (KR) .................. 10-2020-0133810

(51) Int. Cl.
*H04W 72/1268* (2023.01)
*H04L 5/00* (2006.01)
*H04W 72/23* (2023.01)

(52) U.S. Cl.
CPC ....... *H04W 72/1268* (2013.01); *H04L 5/0051* (2013.01); *H04W 72/23* (2023.01)

(58) Field of Classification Search
CPC ............. H04W 72/1268; H04W 72/23; H04L 5/0051; H04L 5/001; H04L 5/0023;
(Continued)

(56) References Cited

U.S. PATENT DOCUMENTS

| | | | | |
|---|---|---|---|---|
| 2020/0351129 A1* | 11/2020 | Kwak | .................... | H04W 80/02 |
| 2020/0389885 A1* | 12/2020 | Tomeba | ................. | H04W 72/21 |
| 2022/0330258 A1* | 10/2022 | Xiao | ..................... | H04L 5/0091 |

FOREIGN PATENT DOCUMENTS

| | | |
|---|---|---|
| CN | 103152083 A | 6/2013 |
| CN | 108260217 A | 7/2018 |

(Continued)

OTHER PUBLICATIONS

Qualcomm Incorporated, "Multi-TRP Enhancements", R1-1907289, 3GPP TSG-RAN WG1 Meeting #97, Reno, Nevada, USA, May 4, 2019, See Section 4.4.
(Continued)

*Primary Examiner* — Jianye Wu
(74) *Attorney, Agent, or Firm* — BRYAN CAVE LEIGHTON PAISNER LLP

(57) ABSTRACT

Disclosed are a method and a device for transmitting or receiving a PUSCH in a wireless communication system. A method for transmitting a physical uplink shared channel (PUSCH) according to an embodiment of the present disclosure may comprise the steps of: receiving first configuration information related to a sounding reference signal (SRS) from a base station; receiving downlink control information (DCI) for PUSCH scheduling from the base station; and transmitting the PUSCH to the base station. On the basis that the first configuration information includes information relating to multiple SRS resource sets, the PUSCH is transmitted at N (N is a natural number) transmission occasions (TOs), and the DCI includes multiple SRS resource indicator (SRI) fields, the PUSCH may be
(Continued)

transmitted at each of the TOs on the basis of an SRS resource in an SRS resource set identified by one SRI field among the multiple SRI fields related to each of the TOs.

12 Claims, 13 Drawing Sheets

(58) Field of Classification Search
CPC ... H04L 5/1469; H04L 5/0035; H04L 5/0044; H04L 5/0053; H04L 5/0094; H04L 27/26134; H04B 7/024; H04B 7/06952; H04B 7/06956; H04B 7/0665; H04B 7/0456; H04B 7/0697; Y02D 30/70
See application file for complete search history.

(56) References Cited

FOREIGN PATENT DOCUMENTS

| CN | 109923828 A | | 6/2019 | |
|---|---|---|---|---|
| CN | 110535614 A | | 12/2019 | |
| CN | 112088550 A | * | 12/2020 | ........... H04B 17/309 |
| EP | 3879738 A1 | * | 9/2021 | ........... H04L 5/0044 |
| KR | 10-2019-0039398 A | | 4/2019 | |
| WO | 2018203728 A1 | | 11/2018 | |
| WO | 2019/111619 A1 | | 6/2019 | |
| WO | 2020019317 A1 | | 1/2020 | |

OTHER PUBLICATIONS

Huawei, "Enhancements on Multi-TRP/panel transmission", R1-1906029, 3GPP TSG RAN WG1 #97, Reno, USA, May 3, 2019, See Section 2.2.1.

Qualcomm Incorporated, "Enhancements on Multi-beam Operation", R1-1909273, 3GPP TSG-RAN WG1 Meeting #98, Prague, Czech, Aug. 17, 2019, See Section 1.

NTT Docomo, Inc, "Enhancements on multi-TRP/panel transmission", 3GPP TSG RAN WG1 #98bis, R1-1911184, Chongqing, China, Oct. 14-20, 2019.

Vivo, "Discussion on Enhancements on Multi-Beam Operation", 3GPP TSG RAN WG1 Meeting #95, R1-1812324, Spokane, USA, Nov. 12-16, 2018.

Qualcomm Incorporated, "Multi-TRP Enhancements", 3GPP TSG-RAN WG1 Meeting #97, R1-1907289, Reno, Nevada, USA, May 13-17, 2019.

* cited by examiner (a)

(b)

METHOD AND DEVICE FOR TRANSMITTING OR RECEIVING PUSCH IN WIRELESS COMMUNICATION SYSTEM

CROSS-REFERENCE TO RELATED APPLICATIONS

This application is the National Stage filing under 35 U.S.C. § 371 of International Application No. PCT/KR2021/003136, filed on Mar. 15, 2021, which claims the benefit of Korean Patent Application No. 10-2020-0031814, filed on Mar. 16, 2020, and Korean Patent Application No. 10-2020-0133810, filed on Oct. 15, 2020, the contents of which are all hereby incorporated by reference herein in their entirety.

TECHNICAL FIELD

The present disclosure relates to a wireless communication system, and in more detail, relates to a method and an apparatus for transmitting and receiving a physical uplink shared channel (PUSCH) in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical problem of the present disclosure is to provide a method and an apparatus of transmitting and receiving a PUSCH.

In addition, an additional technical problem of the present disclosure is to provide a method and an apparatus of transmitting and receiving an SRS (sounding reference signal) and multiple PUSCHs between a terminal and multiple TRPs (transmit reception point).

The technical objects to be achieved by the present disclosure are not limited to the above-described technical objects, and other technical objects which are not described herein will be clearly understood by those skilled in the pertinent art from the following description.

Technical Solution

A method of transmitting a PUSCH (physical uplink shared channel) in a wireless communication system may include receiving, from a base station, first configuration information related to a sounding reference signal (SRS); receiving, from the base station, downlink control information (DCI) for PUSCH scheduling; and transmitting, to the base station, the PUSCH. The first configuration information may include information on a plurality of SRS resource sets, the PUSCH may be transmitted in N (N is a natural number) transmission occasions (TO) and based on the DCI including a plurality of SRS resource indicator (SRI) fields, the PUSCH for each TO may be transmitted based on an SRS resource in an SRS resource set identified by one SRI field among the plurality of SRI fields related to the each TO.

A terminal of transmitting a PUSCH (physical uplink shared channel) in a wireless communication system according to an additional aspect of the present disclosure may include at least one transceiver for transmitting and receiving a wireless signal; and at least one processor for controlling the at least one transceiver. The at least one processor may be configured to receive, from a base station, first configuration information related to a sounding reference signal (SRS); receive, from the base station, downlink control information (DCI) for PUSCH scheduling; and transmit, to the base station, the PUSCH based on the DCI. The first configuration information may include information on a plurality of SRS resource sets, the PUSCH may be transmitted in N (N is a natural number) transmission occasions (TO) and based on the DCI including a plurality of SRS resource indicator (SRI) fields, the PUSCH for each TO may be transmitted based on an SRS resource in an SRS resource set identified by one SRI field among the plurality of SRI fields related to the each TO.

In at least one non-transitory computer-readable medium storing at least one instruction, the one or more instruction executable by at least one processor may control a device of transmitting a PUSCH (physical uplink shared channel) to receive, from a base station, first configuration information related to a sounding reference signal (SRS); receive, from the base station, downlink control information (DCI) for PUSCH scheduling; and transmit, to the base station, the PUSCH based on the DCI. The first configuration information may include information on a plurality of SRS resource sets, the PUSCH may be transmitted in N (N is a natural number) transmission occasions (TO) and based on the DCI including a plurality of SRS resource indicator (SRI) fields, the PUSCH for each TO may be transmitted based on an SRS resource in an SRS resource set identified by one SRI field among the plurality of SRI fields related to the each TO.

In a processing apparatus configured to control a terminal for transmitting a PUSCH (physical uplink shared channel) in a wireless communication system, the processing apparatus may include at least one processor; and at least one computer memory operably connected to the at least one processor and storing instructions that, based on being executed by the at least one processor, perform operations. The operations may include receiving, from a base station, first configuration information related to a sounding reference signal (SRS); receiving, from the base station, downlink control information (DCI) for PUSCH scheduling; and transmitting, to the base station, the PUSCH based on the DCI. The first configuration information may include information on a plurality of SRS resource sets, the PUSCH may be transmitted in N (N is a natural number) transmission occasions (TO) and based on the DCI including a plurality of SRS resource indicator (SRI) fields, the PUSCH for each TO may be transmitted based on an SRS resource in an SRS resource set identified by one SRI field among the plurality of SRI fields related to the each TO.

A method of receiving a PUSCH (physical uplink shared channel) in a wireless communication system may include transmitting, to a terminal, first configuration information related to a sounding reference signal (SRS); transmitting, to the terminal, downlink control information (DCI) for PUSCH scheduling; and receiving, from the terminal, the PUSCH. The first configuration information may include information on a plurality of SRS resource sets, the PUSCH may be transmitted in N (N is a natural number) transmission occasions (TO) and based on the DCI including a plurality of SRS resource indicator (SRI) fields, the PUSCH for each TO may be transmitted based on an SRS resource in an SRS resource set identified by one SRI field among the plurality of SRI fields related to the each TO.

A base station of receiving a PUSCH (physical uplink shared channel) in a wireless communication system according to an additional aspect of the present disclosure may include at least one transceiver for transmitting and receiving a wireless signal and at last one processor for controlling the at least one transceiver. The at least one processor may be configured to transmit, to a terminal, first configuration information related to a sounding reference signal (SRS); transmit, to the terminal, downlink control information (DCI) for PUSCH scheduling; and receive, from the terminal, the PUSCH. The first configuration information may include information on a plurality of SRS resource sets, the PUSCH may be transmitted in N (N is a natural number) transmission occasions (TO) and based on the DCI including a plurality of SRS resource indicator (SRI) fields, the PUSCH for each TO may be transmitted based on an SRS resource in an SRS resource set identified by one SRI field among the plurality of SRI fields related to the each TO.

Advantageous Effects

According to an embodiment of the present disclosure, reliability of data transmission and reception can be improved by transmitting and receiving multiple PUSCHs between multiple TRPs (transmit reception point) and a terminal.

In addition, according to an embodiment of the present disclosure, reliability of data transmission and reception can be improved by transmitting multiple PUSCHs to multiple TRPs by using a configuration for an SRS resource/an SRS resource set configured per each TRP.

In addition, according to an embodiment of the present disclosure, a signaling overhead can be reduced by indicating information on transmission and reception of multiple PUSCHs between multiple TRPs and a terminal through single downlink control information.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

BEST MODE

Figure 1:
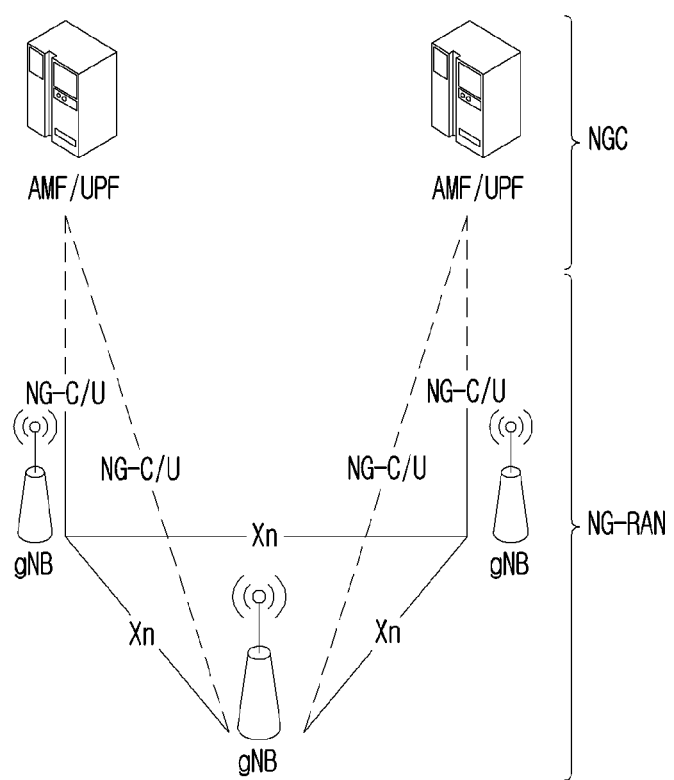
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System) 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
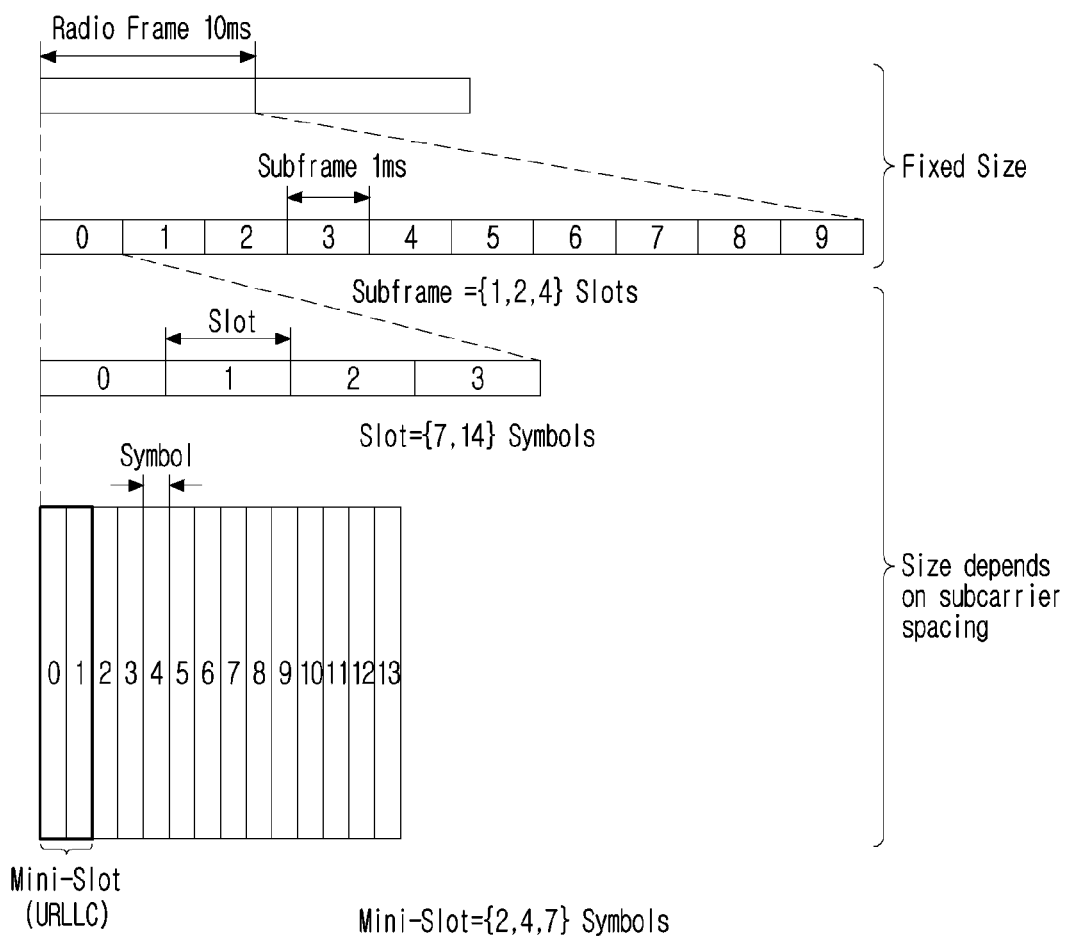
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, p). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | Δf = $2^μ$ · 15 [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz- 7125 MHz | 15, 30, 60 kHz |
| FR2 | 24250 MHz- 52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is 480·$10^3$ Hz and $N_f$ is 4096. Downlink and uplink transmission is configured (organized) with a radio frame having a duration of $T_f=1/(\Delta f_{max} \cdot N_f/100) \cdot T_c=10$ ms. Here, a radio frame is configured with 10 subframes having a duration of $T_{sf}=(\Delta f_{max} \cdot N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration p, slots are numbered in an increasing order of $n_s^μ \in \{0, \ldots, N_{slot}^{subframe,μ}-1\}$ in a subframe and are numbered in an increasing order of $n_{s,f}^μ \in \{0, \ldots, N_{slot}^{frame,μ}-1\}$ in a radio frame. One slot is configured with $N_{symb}^{slot}$ consecutive OFDM symbols and $N_{symb}^{slot}$ is determined according to CP. A start of a slot $n_s^μ$ in a subframe is temporally arranged with a start of an OFDM symbol $n_s^μ N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,μ}$) and the number of slots per subframe ($N_{slot}^{subframe,μ}$) in a normal CP and Table 4 represents the number of OFDM symbols per slot, the number of slots per radio frame and the number of slots per subframe in an extended CP.

TABLE 3

| $\mu$ | $N_{symb}^{slot}$ | $N_{slot}^{frame, \mu}$ | $N_{slot}^{frame, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| $\mu$ | $N_{symb}^{slot}$ | $N_{slot}^{frame, \mu}$ | $N_{slot}^{frame, \mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
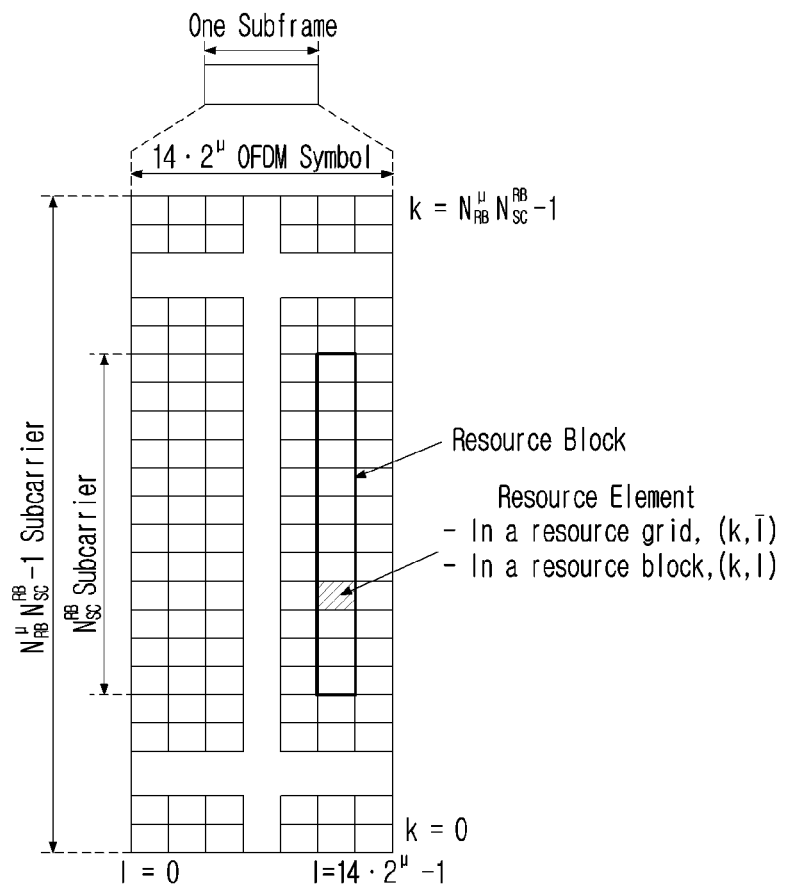
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^{\mu} N_{sc}^{RB}$ subcarriers in a frequency domain and one subframe is configured with 14·2$^{\mu}$ OFDM symbols, but it is not limited thereto. In an NR system, a transmitted signal is described by OFDM symbols of $2^{\mu} N_{symb}^{(\mu)}$ and one or more resource grids configured with $N_{RB}^{\mu} N_{sc}^{RB}$ subcarriers. Here, $N_{RB}^{\mu} \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, k=0, . . . , $N_{RB}^{\mu} N_{sc}^{RB}-1$ is an index in a frequency domain and l'=0, . . . , $2^{\mu} N_{symb}^{(\mu)}-1$ refers to a position of a symbol in a subframe. When referring to a resource element in a slot, an index pair (k,l) is used. Here, l=0, . . . , $N_{symb}^{\mu}-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
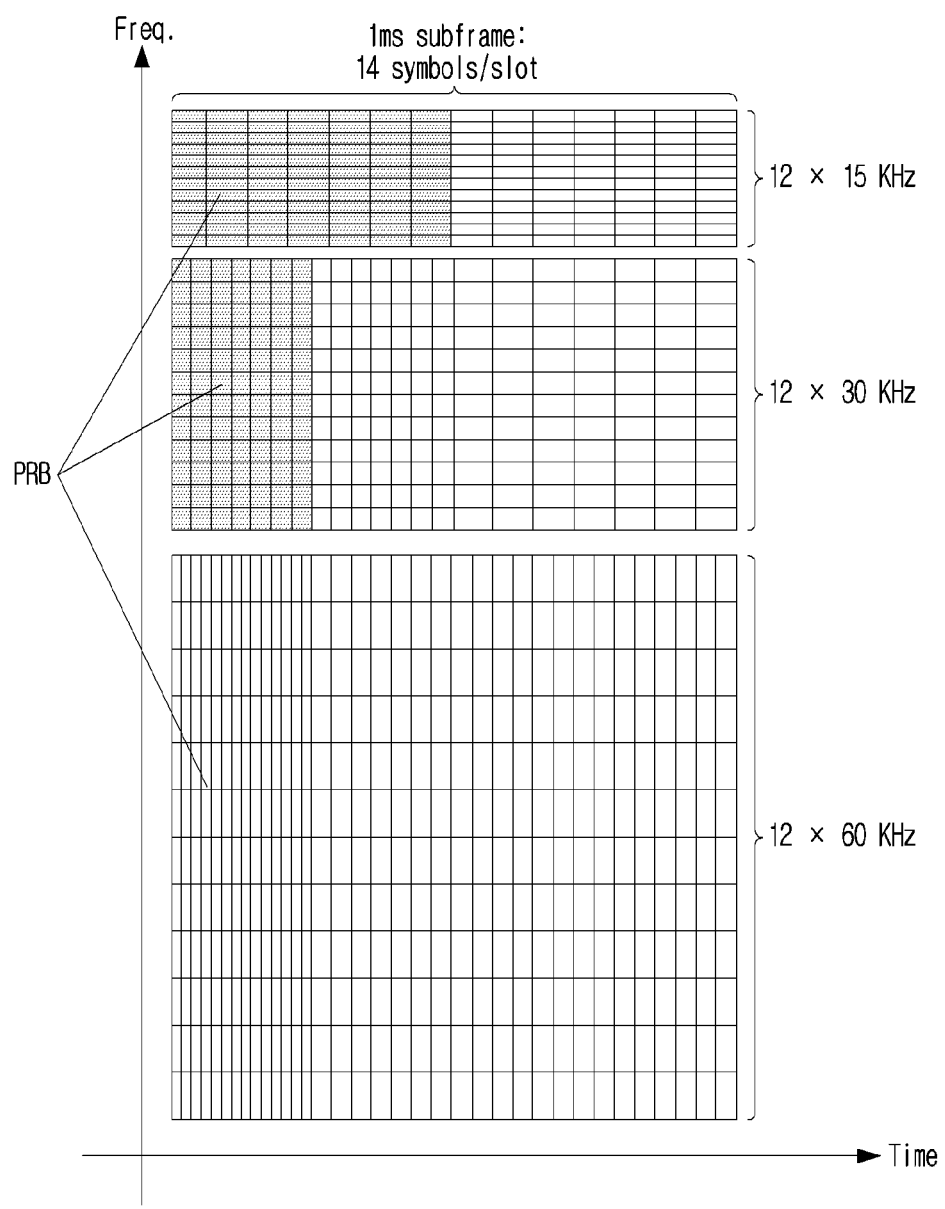
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
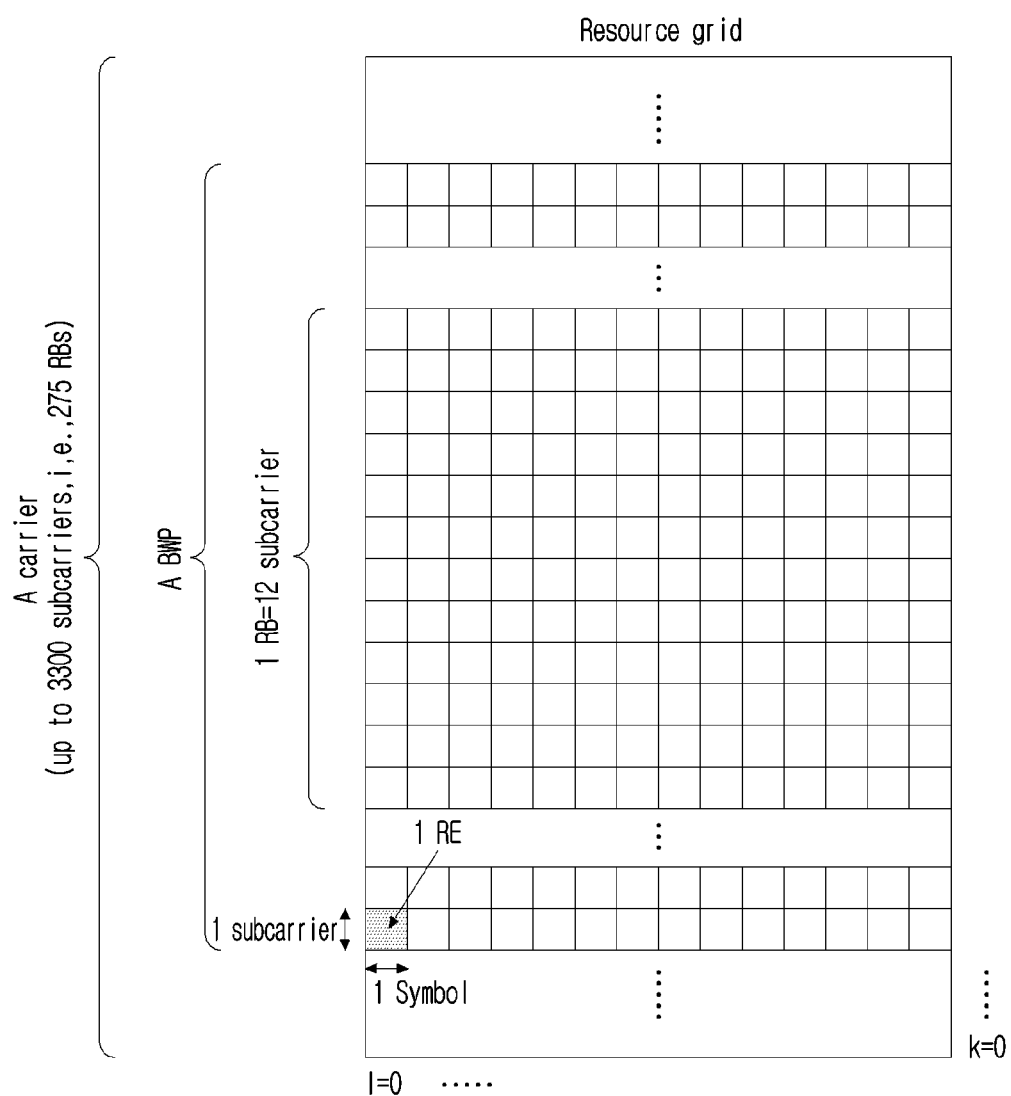
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
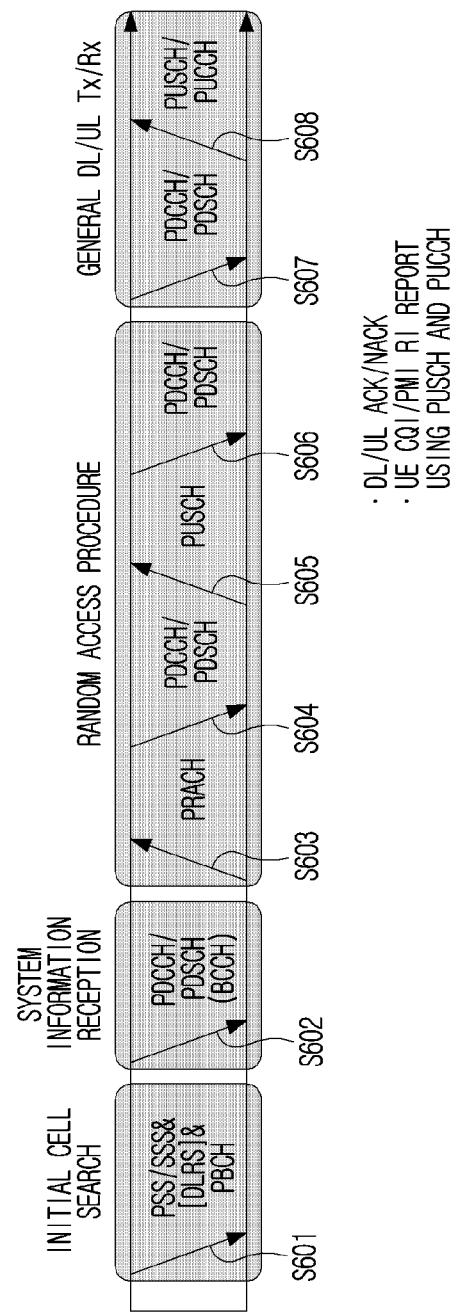
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid—Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be predefined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Multi Panel Operations

'A panel' referred to in the present disclosure may be interpreted/applied as 'a plurality of (or at least one) panels' or 'a panel group' (having a similarity/a common value from a viewpoint of a specific characteristic (e.g., timing advance (TA), a power control parameter, etc.)). Alternatively, 'a panel' referred to in the present disclosure may be interpreted/applied as 'a plurality of (or at least one) antenna ports' or 'a plurality of (or at least one) uplink resources' or 'an antenna port group' or 'an uplink resource group (or set)' (having a similarity/a common value from a viewpoint of a specific characteristic (e.g., TA, a power control parameter, etc.)). Alternatively, 'a panel' referred to in the present disclosure may be interpreted/applied as 'a plurality of (or at least one) beams' or 'at least one beam group (or set)' (having a similarity/a common value from a viewpoint of a specific characteristic (e.g., TA, a power control parameter, etc.)). Alternatively, 'a panel' referred to in the present disclosure may be defined as a unit for a terminal to configure a transmission/reception beam. For example, 'a transmission panel' may generate a plurality of candidate transmission beams in one panel, but it may be defined as a unit which may use only one beam of them in transmission at a specific time. In other words, only one transmission beam (spatial relation information RS) may be used per Tx panel to transmit a specific uplink signal/channel. In addition, 'a panel' in the present disclosure may refer to 'a plurality of (or at least one) antenna ports' or 'an antenna port group' or 'an uplink resource group (or set)' with common/similar uplink synchronization and may be interpreted/applied as an expression which is generalized as 'an uplink synchronization unit (USU)'. In addition, 'a panel' in the present disclosure may be interpreted/applied as an expression which is generalized as 'an uplink transmission entity (UTE)'.

In addition, the 'uplink resource (or resource group)' may be interpreted/applied as a PUSCH/PUCCH/SRS/PRACH resource (or resource group (or set)). In addition, the interpretation/application may be interpreted/applied conversely. In addition, 'an antenna (or an antenna port)' may represent a physical or logical antenna (or antenna port) in the present disclosure.

In other words, 'a panel' referred to in the present disclosure may be variously interpreted as 'a terminal antenna element group', 'a terminal antenna port group', 'a terminal logical antenna group', etc. In addition, for which physical/logical antennas or antenna ports will be combined and mapped to one panel, a variety of schemes may be considered by considering a position/a distance/a correlation between antennas, a RF configuration, and/or an antenna (port) virtualization scheme, etc. Such a mapping process may be changed according to terminal implementation. In addition, 'a panel' referred to in the present disclosure may be interpreted/applied as 'a plurality of panels' or 'a panel group' (having a similarity from a viewpoint of a specific characteristic).

Hereinafter, multi-panel structures will be described.

Terminal modeling which installs a plurality of panels (e.g., configured with one or a plurality of antennas) in terminal implementation in a high-frequency band (e.g., bi-directional two panels in 3GPP UE antenna modeling). A variety of forms may be considered in implementing a plurality of panels of such a terminal. Contents described below are described based on a terminal which supports a plurality of panels, but they may be extended and applied to a base station (e.g., a TRP) which supports a plurality of panels. The after-described contents related to multi-panel structures may be applied to transmission and reception of a signal and/or a channel considering multi panels described in the present disclosure.

Figure 7:
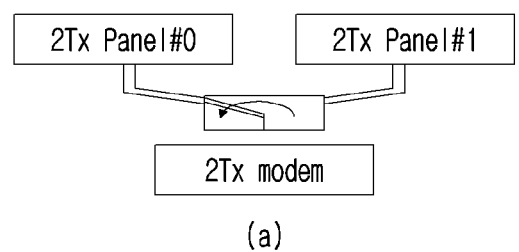
FIG. 7 is a diagram illustrating multi panel terminals in a wireless communication system to which the present disclosure may be applied.
Figure 7:
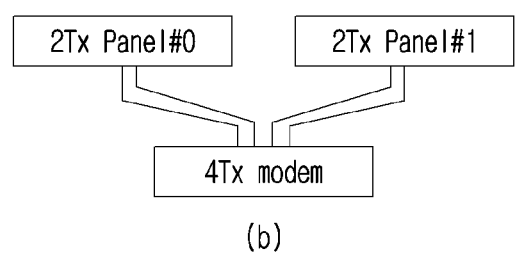

FIG. 7 is a diagram illustrating multi panel terminals in a wireless communication system to which the present disclosure may be applied.

FIG. 7(*a*) illustrates implementation of RF (radio frequency) switch-based multi panel terminals and FIG. 7(*b*) illustrates implementation of RF connection-based multi panel terminals.

For example, it may be implemented based on a RF switch as in FIG. 7(*a*). In this case, only one panel is activated for a moment and it may be impossible to transmit a signal for a certain duration of time to change an activated panel (i.e., panel switching).

For implementation of a plurality of panels in a different way, a RF chain may be connected respectively so that each panel can be activated anytime as in FIG. 7(*b*). In this case, time for panel switching may be 0 or too little. And, it may be possible to simultaneously transmit a signal by activating a plurality of panels at the same time (STxMP: simultaneous transmission across multi-panel) according to a model and power amplifier configuration.

For a terminal having a plurality of panels, a radio channel state may be different per panel, and in addition, a RF/antenna configuration may be different per panel, so a method in which a channel is estimated per panel is needed. In particular, a process in which one or a plurality of SRS resources are transmitted respectively per panel is needed to measure uplink quality or manage an uplink beam, or to measure downlink quality per panel or manage a downlink beam by utilizing channel reciprocity. Here, a plurality of SRS resources may be SRS resources which are transmitted by a different beam in one panel or may be SRS resources which are repeatedly transmitted by the same beam. Hereinafter, for convenience, a set of SRS resources transmitted in the same panel (a specific usage parameter (e.g., beam management, antenna switching, a codebook-based PUSCH, a non-codebook based PUSCH) and a specific time domain behavior (e.g., aperiodic, semi-persistent, or periodic)) may be referred to as an SRS resource group. For this SRS resource group, an SRS resource set configuration supported in a Rel-15 NR system may be utilized as it is or it may be configured separately by bundling one or a plurality of SRS resources (having the same time domain behavior and usage).

For reference, only when usage is beam management for the same usage and time domain behavior in Rel-15, a plurality of SRS resource sets may be configured. In addition, it is defined so that simultaneous transmission cannot be performed between SRS resources configured in the same SRS resource set, but simultaneous transmission can be performed between SRS resources belonging to a different SRS resource set. Accordingly, if panel implementation and simultaneous transmission of a plurality of panels as in FIG. 7(b) are considered, a corresponding concept (an SRS resource set) itself may be matched to an SRS resource group. But, an SRS resource group may be separately defined if even implementation (panel switching) as in FIG. 7(a) is considered. In an example, a configuration may be given by giving a specific ID to each SRS resource so that resources with the same ID belong to the same SRS resource group and resources with a different ID belong to a different resource group.

For example, it is assumed that 4 SRS resource sets configured for BM usage (RRC parameter usage is configured as 'BeamManagement') are configured to a UE. Hereinafter, for convenience, each is referred to as SRS resource set A, B, C, D. In addition, a situation is considered which applies implementation performing SRS transmission by corresponding each of the sets to one (Tx) panel because UE implements a total of 4 (Tx) Panels.

TABLE 6

| The maximum number of SRS resource sets across all time domain behaviors (periodic/semi-persistent/aperiodic) reported in 2-30 | Additional limit to the maximum number of the maximum SRS resource sets per supported time domain behavior (periodic/semi-persistent/aperiodic) |
|---|---|
| 1 | 1 |
| 2 | 1 |
| 3 | 1 |
| 4 | 2 |
| 5 | 2 |
| 6 | 2 |
| 7 | 4 |
| 8 | 4 |

In Rel-15 standards, such UE implementation is more clearly supported by the following agreement. In other words, for a UE which performs capability reporting for a value reported in feature group (FG) 2-30 as 7 or 8 in Table 6, a total of up to 4 SRS resource sets for BM (per supported time domain behavior) may be configured as in the right column of Table 6. As above, implementation which performs transmission by corresponding one UE panel to each set may be applied. Here, when 4 panel UE corresponds each panel to one SRS resource set for BM and transmits it, the number itself of configurable SRS resources per each set is also supported by separate UE capability signaling. For example, it is assumed that 2 SRS resources are configured in the each set. It may correspond to 'the number of UL beams' which may be transmitted per panel. In other words, the UE may respectively correspond 2 UL beams to 2 configured SRS resources per each panel and transmit them when 4 panels are implemented. In this situation, according to Rel-15 standards, one of a codebook (CB)-based UL or non-codebook (NCB)-based UL mode may be configured for final UL PUSCH transmission scheduling. In any case, only one SRS resource set (having usage set as "CB-based UL" or "NCB-based UL") configuration, i.e., only one dedicated SRS resource set (for a PUSCH) configuration, is supported in Rel-15 standards.

Hereinafter, multi panel UE (MPUE) categories will be described.

Regarding the above-described multi panel operations, the following 3 MPUE categories may be considered. Specifically, 3 MPUE categories may be classified according to i) whether multiple panels may be activated and/or ii) transmission using multiple panels may be possible.

i) MPUE category 1: In a terminal that multiple panels are implemented, only one panel may be activated at a time. A delay for panel switching/activation may be configured as [X] ms. In an example, the delay may be configured to be longer than a delay for beam switching/activation and may be configured in a unit of a symbol or in a unit of a slot. MPUE category 1 may correspond to MPUE-assumption1 described in standardization-related documents (e.g., a 3gpp agreement, a technical report (TR) document and/or a technical specification (TS) document, etc.).

ii) MPUE category 2: In a terminal that multiple panels are implemented, multiple panels may be activated at a time. One or more panels may be used for transmission. In other words, simultaneous transmission using panels may be performed in a corresponding category. MPUE category 2 may correspond to MPUE-assumption2 described in standardization-related documents (e.g., a 3gpp agreement, a TR document and/or a TS document, etc.).

iii) MPUE category 3: In a terminal that multiple panels are implemented, multiple panels may be activated at a time, but only one panel may be used for transmission. MPUE category 3 may correspond to MPUE-assumption3 described in standardization-related documents (e.g., a 3gpp agreement, a TR document and/or a TS document, etc.).

Regarding multi panel-based signal and/or channel transmission and reception suggested in the present disclosure, at least one of the above-described 3 MPUE categories may be supported. In an example, in Rel-16, MPUE category 3 of the following 3 MPUE categories may be (selectively) supported.

In addition, information on a MPUE category may be predefined in specifications (i.e., standards). Alternatively, information on a MPUE category may be configured semi-statically and/or may be indicated dynamically according to a system situation (i.e., a network aspect, a terminal aspect). In this case, a configuration/an indication, etc. related to multi panel-based signal and/or channel transmission and reception may be configured/indicated by considering a MPUE category.

Hereinafter, a configuration/an indication related to panel-specific transmission/reception will be described.

Regarding a multi panel-based operation, signal and/or channel transmission and reception may be performed in a panel-specific way. Here, being panel-specific may mean that signal and/or channel transmission and reception in a unit of a panel may be performed. Panel-specific transmission and reception may be referred to as panel-selective transmission and reception.

Regarding panel-specific transmission and reception in a multi panel-based operation suggested in the present disclosure, a method of using identification information (e.g., an identifier (ID), an indicator, etc.) for configuring and/or indicating a panel which will be used for transmission and reception among one or more panels may be considered.

In an example, an ID for a panel may be used for panel-selective transmission of a PUSCH, a PUCCH, an SRS, and/or a PRACH among activated multiple panels. The ID may be configured/defined based on at least any one of the following 4 methods (options (Alts) 1, 2, 3, 4).

i) Alt.1: An ID for a panel may be an SRS resource set ID.

In an example, it may be desirable to correspond each UE Tx panel to an SRS resource set configured in terms of terminal implementation when considering a) an aspect that SRS resources of multiple SRS resource sets having the same time domain behavior are simultaneously transmitted in the same BWP, b) an aspect that a power control parameter is configured in a unit of an SRS resource set, c) an aspect that a terminal may report up to 4 SRS resource sets (they may correspond to up to 4 panels) according to a supported time domain behavior. In addition, an Alt.1 scheme has an advantage that an SRS resource set related to each panel may be used for 'codebook' and 'non-codebook'-based PUSCH transmission. In addition, for an Alt.1 scheme, multiple SRS resources belonging to multiple SRS resource sets may be selected by extending an SRI (SRS resource indicator) field of DCI. In addition, a mapping table of an SRI to SRS resource may need to be extended to include SRS resources in the whole SRS resource set.

ii) Alt.2: An ID for a panel may be an ID which is (directly) associated with a reference RS resource and/or a reference RS resource set.

ii) Alt.3: An ID for a panel may be an ID which is directly associated with a target RS resource (a reference RS resource) and/or a reference RS resource set.

An Alt.3 scheme has an advantage that configured SRS resource set(s) corresponding to one UE Tx panel may be controlled more easily and that the same panel identifier may be allocated to multiple SRS resource sets having a different time domain behavior.

iv) Alt.4: An ID for a panel may be an ID which is additionally configured to spatial relation information (e.g., RRC_SpatialRelationInfo).

An Alt.4 scheme may be a scheme which newly adds information for representing an ID for a panel. In this case, it has an advantage that configured SRS resource sets corresponding to one UE Tx panel may be controlled more easily and that the same panel identifier may be allocated to multiple SRS resource sets having a different time domain behavior.

In an example, a method of introducing an UL TCI similarly to the existing DL TCI (Transmission Configuration Indication) may be considered. Specifically, definition of a UL TCI state may include a list of reference RS resources (e.g., an SRS, a CSI-RS and/or an SSB). A current SRI field may be reused to select a UL TCI state from a configured set or a new DCI field of DCI format 0_1 (e.g., a UL-TCI field) may be defined for a corresponding purpose.

Information related to the above-described panel-specific transmission and reception (e.g., a panel ID, etc.) may be transmitted by higher layer signaling (e.g., a RRC message, MAC-CE, etc.) and/or lower layer signaling (e.g., layer1 (L1: Layer1) signaling, DCI, etc.). Corresponding information may be transmitted from a base station to a terminal or may be transmitted from a terminal to a base station according to a situation or if necessary.

In addition, corresponding information may be configured by a hierarchical method which configures a set for a candidate group and indicates specific information.

In addition, the above-described identification information related to a panel may be configured in a unit of a single panel or in a unit of multiple panels (e.g., a panel group, a panel set).

Sounding Reference Signal (SRS) Sounding Reference Signal)

In Rel-15 NR, spatialRelationInfo may be used in order for a base station to indicate to a terminal a transmission beam which will be used when transmitting an UL channel. A base station may indicate which UL transmission beam will be used when transmitting a PUCCH and an SRS by configuring a DL reference signal (e.g., an SSB-RI (SB Resource Indicator), a CRI (CSI-RS Resource Indicator) (P/SP/AP: periodic/semi-persistent/aperiodic)) or an SRS (i.e., an SRS resource) as a reference RS for a target UL channel and/or a target RS through a RRC configuration. In addition, when a base station schedules a PUSCH to a terminal, a transmission beam which is indicated by a base station and used for SRS transmission is indicated as a transmission beam for a PUSCH through an SRI field and used as a PUSCH transmission beam of a terminal.

Hereinafter, an SRS for a codebook (CB) and a non-codebook (NCB) is described.

First, for a CB UL, a base station may first configure and/or indicate transmission of an SRS resource set for 'a CB' to a terminal. In addition, a terminal may transmit any n port SRS resource in a corresponding SRS resource set. A base station may receive a UL channel based on transmission of a corresponding SRS and use it for PUSCH scheduling of a terminal. Subsequently, a base station may indicate a PUSCH (transmission) beam of a terminal by indicating an SRS resource for 'a CB' which is previously transmitted by a terminal through an SRI field of DCI when performing PUSCH scheduling through UL DCI. In addition, a base station may indicate an UL rank and an UL precoder by indicating an uplink codebook through a TPMI (transmitted precoder matrix indicator) field. Thereby, a terminal may perform PUSCH transmission according to a corresponding indication.

Next, for a NCB UL, a base station may first configure and/or indicate transmission of an SRS resource set for 'a non-CB' to a terminal. In addition, a terminal may simultaneously transmit corresponding SRS resources by determining a precoder of SRS resources (up to 4 resources, 1 port per resource) in a corresponding SRS resource set based on reception of a NZP CSI-RS associated with a corresponding SRS resource set. Subsequently, a base station may indicate a PUSCH (transmission) beam of a terminal and an UL rank and an UL precoder at the same time by indicating part of SRS resources for 'a non-CB' which are previously transmitted by a terminal through an SRI field of DCI when performing PUSCH scheduling through UL DCI. Thereby, a terminal may perform PUSCH transmission according to a corresponding indication.

Hereinafter, an SRS for beam management is described.

An SRS may be used for beam management. Specifically, UL BM may be performed by beamformed UL SRS transmission. Whether UL BM of an SRS resource set is applied is configured by (a higher layer parameter) 'usage'. When usage is configured as 'BeamManagement (BM)', only one SRS resource may be transmitted to each of a plurality of SRS resource sets in a given time instant. A terminal may be configured with one or more Sounding Reference Symbol (SRS) resource sets configured by (a higher layer parameter) 'SRS-ResourceSet' (through higher layer signaling, e.g., RRC signaling, etc.). For each SRS resource set, a UE may be configured with K≥1 SRS resources (a higher layer parameter, 'SRS-' resources). Here, K is a natural number, and the maximum value of K is indicated by SRS_capability.

Hereinafter, an SRS for antenna switching will be described.

An SRS may be used for acquisition of DL CSI (Channel State Information) information (e.g., DL CSI acquisition). In a specific example, a BS (Base station) may measure an SRS from a UE after scheduling transmission of an SRS to a UE (User Equipment) under a situation of a single cell or multi cells (e.g., carrier aggregation (CA)) based on TDD. In this case, a base station may perform scheduling of a DL signal/channel to a UE based on measurement by an SRS by assuming DL/UL reciprocity. Here, regarding SRS-based DL CSI acquisition, an SRS may be configured for antenna switching.

In an example, when following standards (e.g., 3gpp TS38.214), usage of an SRS may be configured to a base station and/or a terminal by using a higher layer parameter (e.g., usage of a RRC parameter, SRS-ResourceSet). Here, usage of an SRS may be configured as usage of beam management, usage of codebook transmission, usage of non-codebook transmission, usage of antenna switching, etc.

Hereinafter, a case in which SRS transmission (i.e., transmission of an SRS resource or an SRS resource set) is configured for antenna switching among the usages will be specifically described.

In an example, for a terminal with partial reciprocity, SRS transmission based on antenna switching (i.e., transmission antenna switching) may be supported for DL (downlink) CSI (Channel State Information) acquisition through SRS transmission under a situation such as TDD (Time Division Duplex). When antenna switching is applied, about 15 μs may be generally needed between SRS resources (and/or resources between an SRS resource and a PUSCH/PUCCH) for antenna switching of a terminal. By considering it, (the minimum) guard period as in the following Table 7 may be defined.

TABLE 7

| μ | $\Delta f = 2^\mu \cdot 15$ [kHz] | Y [Symbol] |
|---|---|---|
| 0 | 15 | 1 |
| 1 | 30 | 1 |
| 2 | 60 | 1 |
| 3 | 120 | 2 |

In Table 7, μ represents numerology, Δf represents subcarrier spacing and Y represents the number of symbols of a guard period, i.e., a length of a guard period. In reference to Table 7, the guard period may be configured based on a parameter μ which determines numerology. In the guard period, a terminal may be configured not to transmit any other signal and the guard period may be configured to be used fully for antenna switching. In an example, the guard period may be configured by considering SRS resources transmitted in the same slot. In particular, when a terminal is configured and/or indicated to transmit an aperiodic SRS configured by intra-slot antenna switching, a corresponding terminal may transmit an SRS on each designated SRS resource by using a different transmission antenna and the above-described guard period may be configured between each resource.

In addition, as described above, when a terminal is configured with an SRS resource and/or an SRS resource set configured for antenna switching through higher layer signaling, a corresponding terminal may be configured to perform SRS transmission based on UE capability related to antenna switching. In this case, UE capability related to antenna switching may be '1T2R', '2T4R', '1T4R', '1T4R/2T4R', '1T1R', '2T2R', '4T4R', etc. Here, 'mTnR' may mean UE capability which supports m transmission and n reception.

(Example S1) For example, for a terminal which supports 1T2R, up to 2 SRS resource sets may be configured as a different value for resourceType of a higher layer parameter, SRS-ResourceSet. In this case, each SRS resource set may have 2 SRS resources transmitted in different symbols and each SRS resource may configure a single SRS port in a given SRS resource set. In addition, an SRS port for a second SRS resource in an SRS resource set may be configured to be associated with a UE antenna port different from an SRS port for a first SRS resource in the same SRS resource set.

(Example S2) In another example, for a terminal which supports 2T4R, up to 2 SRS resource sets may be configured as a different value for resourceType of a higher layer parameter, SRS-ResourceSet. Here, each SRS resource set may have 2 SRS resources transmitted in different symbols and each SRS resource may configure 2 SRS ports in a given SRS resource set. In addition, an SRS port pair for a second SRS resource in an SRS resource set may be configured to be associated with a UE antenna port different from an SRS port pair for a first SRS resource in the same SRS resource set.

(Example S3) In another example, for a terminal which supports 1T4R, SRS resource sets may be configured by a different scheme according to whether SRS transmission is configured as periodic, semi-persistent and/or aperiodic. First, when SRS transmission is configured as periodic or semi-persistent, 0 SRS resource set configured or 1 SRS resource set configured with 4 SRS resources based on resourceType of a higher layer parameter SRS-ResourceSet may be configured to be transmitted in different symbols. Here, each SRS resource may configure a single SRS port in a given SRS resource set. In addition, an SRS port for each SRS resource may be configured to be associated with a different UE antenna port. On the other hand, when SRS transmission is configured as aperiodic, 0 SRS resource set configured or 2 SRS resource sets configured with a total of 4 SRS resources based on resourceType of a higher layer parameter SRS-ResourceSet may be configured to be transmitted in different symbols of 2 different slots. Here, an SRS port for each SRS resource in 2 given SRS resource sets may be configured to be associated with a different UE antenna port.

(Example S4) In another example, for a terminal which supports 1T1R, 2T2R, or 4T4R, up to 2 SRS resource sets respectively configured with one SRS resource sets may be configured for SRS transmission. The number of SRS ports of each SRS resource may be configured to be 1, 2, or 4.

When indicated UE capability is 1T4R/2T4R, a corresponding terminal may expect that the same number of SRS ports (e.g., 1 or 2) will be configured for all SRS resources in SRS resource set(s). In addition, when indicated UE capability is 1T2R, 2T4R, 1T4R, or 1T4R/2T4R, a corresponding terminal may not expect that one or more SRS resource sets configured for antenna switching in the same slot will be configured or triggered. In addition, when indicated UE capability is 1T1R, 2T2R, or 4T4R, a corresponding terminal may not expect that one or more SRS resource sets configured for antenna switching in the same slot will be configured or triggered.

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission (JT), coordinated Scheduling (CS), coordinated Beamforming (CB), dynamic Point Selection (DPS), dynamic Point Blocking (DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

For TDM based URLLC M-TRP transmission, scheme 3/4 is under discussion for standardization. Specifically, scheme 4 means a scheme in which one TRP transmits a transport block (TB) in one slot and it has an effect to improve a probability of data reception through the same TB received from multiple TRPs in multiple slots. Meanwhile, scheme 3 means a scheme in which one TRP transmits a TB through consecutive number of OFDM symbols (i.e., a symbol group) and TRPs may be configured to transmit the same TB through a different symbol group in one slot.

In addition, UE may recognize PUSCH (or PUCCH) scheduled by DCI received in different control resource sets (CORESETs) (or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH) transmitted to different panels belonging to the same TRP.

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N (ACK/NACK), SR (scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

NCJT (Non-coherent joint transmission) is a scheme in which a plurality of transmission points (TP) transmit data to one terminal by using the same time frequency resource, TPs transmit data by using a different DMRS (Demodulation Multiplexing Reference Signal) between TPs through a different layer (i.e., through a different DMRS port).

A TP delivers data scheduling information through DCI to a terminal receiving NCJT. Here, a scheme in which each TP participating in NCJT delivers scheduling information on data transmitted by itself through DCI is referred to as 'multi DCI based NCJT'. As each of N TPs participating in NCJT transmission transmits DL grant DCI and a PDSCH to UE, UE receives N DCI and N PDSCHs from N TPs. Meanwhile, a scheme in which one representative TP delivers scheduling information on data transmitted by itself and data transmitted by a different TP (i.e., a TP participating in NCJT) through one DCI is referred to as 'single DCI based NCJT'. Here, N TPs transmit one PDSCH, but each TP transmits only some layers of multiple layers included in one PDSCH. For example, when 4-layer data is transmitted, TP 1 may transmit 2 layers and TP 2 may transmit 2 remaining layers to UE.

Hereinafter, partially overlapped NCJT will be described.

In addition, NCJT may be classified into fully overlapped NCJT that time frequency resources transmitted by each TP are fully overlapped and partially overlapped NCJT that only some time frequency resources are overlapped. In other words, for partially overlapped NCJT, data of both of TP 1 and TP 2 are transmitted in some time frequency resources and data of only one TP of TP 1 or TP 2 is transmitted in remaining time frequency resources.

Hereinafter, a method for improving reliability in Multi-TRP will be described.

As a transmission and reception method for improving reliability using transmission in a plurality of TRPs, the following two methods may be considered.

Figure 8:
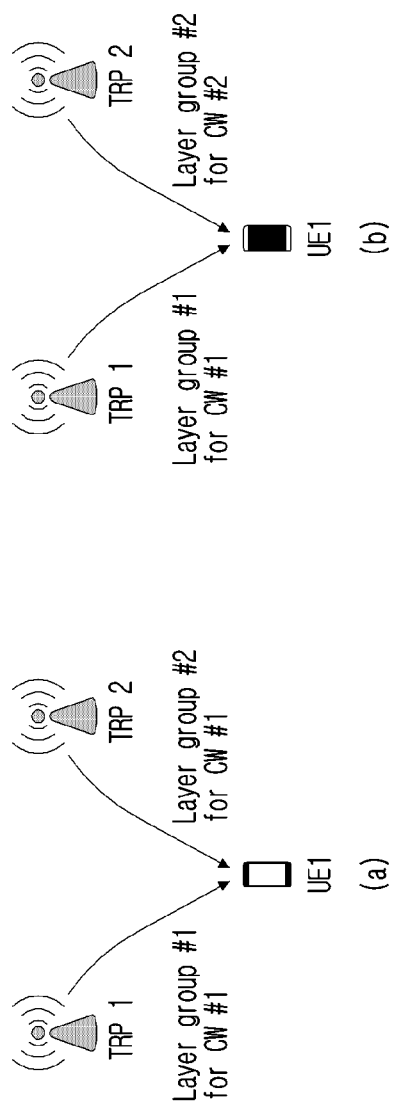
FIG. 8 illustrates a multi-TRP transmission method in a wireless communication system to which the present disclosure may be applied.

FIG. 8 illustrates a method of multiple TRPs transmission in a wireless communication system to which the present disclosure may be applied.

In reference to FIG. 8(a), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 8(b), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 8(b), it may have a disadvantage that a code rate corresponding to a TB is higher compared to FIG. 8(a). However, it has an advantage that it may adjust a code rate by indicating a different RV (redundancy version) value or may adjust a modulation order of each CW for encoded bits generated from the same TB according to a channel environment.

According to methods illustrated in FIG. 8(a) and FIG. 8(b) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Uplink Power Control

It may be necessary to increase or decrease transmission power of a terminal (e.g., user equipment (UE) and/or a mobile device) according to a situation in a wireless communication system. As such, controlling transmission power of a terminal and/or a mobile device may be referred to as uplink power control. In an example, a method of controlling transmission power may be applied to satisfy requirements of a base station (e.g., gNB, eNB, etc.) (e.g., a SNR (Signal-to-Noise Ratio), a BER (Bit Error Ratio), a BLER (Block Error Ratio), etc.).

Power control as described above may be performed by an open-loop power control method and a closed-loop power control method.

Specifically, an open-loop power control method means a method of controlling transmission power without a feedback from a transmission device (e.g., a base station, etc.) to a reception device (e.g., a terminal, etc.) and/or a feedback from a reception device to a transmission device. In an example, a terminal may receive a specific channel/signal (a pilot channel/signal) from a base station and estimate strength of reception power by using it. Subsequently, a terminal may control transmission power by using strength of an estimated reception power.

Unlike it, a closed-loop power control method means a method of controlling transmission power based on a feedback from a transmission device to a reception device and/or a feedback from a reception device to a transmission device. In an example, a base station receives a specific channel/signal from a terminal and determines the optimum power level of a terminal based on a power level measured by a received specific channel/signal, SNR, BER, BLER, etc. A base station delivers information on a determined optimum power level (i.e., a feedback) to a terminal through a control channel, etc. and a corresponding terminal may control transmission power by using a feedback provided by a base station.

Hereinafter, a power control method for cases in which a terminal and/or a mobile device performs uplink transmission to a base station in a wireless communication system will be described specifically.

Specifically, hereinafter, power control methods for 1) uplink data channel (e.g., a PUSCH (Physical Uplink Shared Channel)), 2) uplink control channel (e.g., a PUCCH (Physical Uplink Control Channel)), 3) sounding reference signal (SRS), 4) random access channel (e.g., a PRACH (Physical Random Access Channel)) transmission are described. Here, a transmission occasion for a PUSCH, a PUCCH, an SRS and/or a PRACH (i.e., a transmission time unit) (i) may be defined by a slot index (n_s) in a frame of a system frame number (SFN), a first symbol (S) in a slot, the number (L) of consecutive symbols, etc.

Hereinafter, for convenience of a description, a power control method is described based on a case in which a terminal performs PUSCH transmission. Of course, a corresponding method may be extended and applied to other uplink data channel supported in a wireless communication system.

For PUSCH transmission in an active UL bandwidth part (UL BWP) of a carrier (f) of a serving cell (c), a terminal may calculate a linear power value of transmission power determined by the following Equation 3. Subsequently, a corresponding terminal may control transmission power by considering the number of antenna ports and/or the number of SRS ports, etc. for a calculated linear power value.

Specifically, when a terminal performs PUSCH transmission in an active UL BWP (b) of a carrier (f) of a serving cell (c) by using a parameter set configuration based on index j and a PUSCH power control adjustment state based on index l, a terminal may determine PUSCH transmission power $P_{PUSCH,b,f,c}(i,j,q_d,l)$ (dBm) at a PUSCH transmission occasion (i) based on the following Equation 3.

[Equation 3]

$$P_{PUSCH,b,f,c}(i,j,q_d,l) = \min\begin{cases} P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i,l) \end{cases}$$

In Equation 3, index j represents an index for an open-loop power control parameter (e.g., $P_O$, alpha ($\alpha$), etc.) and up to 32 parameter sets may be configured per cell. Index q_d represents an index of a DL RS resource for pathloss (PL) measurement (e.g., $PL_{b,f,c}(q_d)$) and up to 4 measured values may be configured per cell. Index 1 represents an index for a closed-loop power control process and up to 2 processes may be configured per cell.

Specifically, as $P_O$ (e.g., $P_{O\_PUSCH,b,f,c}(j)$) is a parameter which is broadcast as part of system information, it may represent target reception power from reception. A corresponding Po value may be configured by considering throughput of a terminal, capacity of a cell, noise and/or interference, etc. In addition, alpha (e.g., $\alpha_{b,f,c}(j)$) may represent a ratio which performs compensation for pathloss. Alpha may be configured as a value from 0 to 1 and according to a configured value, full pathloss compensation or fractional pathloss compensation may be performed. In this case, the alpha value may be configured by considering interference and/or a data rate, etc. between terminals. In addition, $P_{CMAX,f,c}(i)$ may represent configured UE transmit power. In an example, the configured UE transmit power may be interpreted as 'configured maximum UE output power' defined in 3GPP TS 38.101-1 and/or TS38.101-2. In addition, $M_{RB,b,f,c}^{PUSCH}(i)$ may represent bandwidth of PUSCH resource allocation expressed as the number of resource blocks (RB) for a PUSCH transmission occasion based on a subcarrier spacing ($\mu$). In addition, $f_{b,f,c}(i,l)$ related to a PUSCH power control adjustment state may be configured or indicated based on a TPC command field of DCI (e.g., DCI format 0_0, DCI format 0_1, DCI format 2_2, DCI format 2_3, etc.).

In this case, a specific RRC (Radio Resource Control) parameter (e.g., SRI-PUSCHPowerControl-Mapping, etc.) may represent a linkage between an SRI (SRS Resource Indicator) field of DCI (downlink control information) and the above-described index j, q_d, l. In other words, the above-described index j, l, q_d, etc. may be associated with a beam, a panel and/or a spatial domain transmission filter, etc. based on specific information. Thereby, PUSCH transmission power control in a unit of a beam, a panel and/or a spatial domain transmission filter may be performed.

Parameters and/or information for the above-described PUSCH power control may be configured individually (i.e., independently) per BWP. In this case, corresponding parameters and/or information may be configured or indicated by higher layer signaling (e.g., RRC signaling, a MAC-CE (Medium Access Control-Control Element), etc.) and/or DCI, etc. In an example, a parameter and/or information for PUSCH power control may be transmitted through RRC signaling PUSCH-ConfigCommon, PUSCH-PowerControl, etc. and PUSCH-ConfigCommon, PUSCH-PowerControl may be configured as in the following Equation 8.

TABLE 8

| | |
|---|---|
| PUSCH-ConfigCommon ::= | SEQUENCE { |
| groupHoppingEnabledTransformPrecoding | ENUMERATED {enabled} |
| pusch-TimeDomainAllocationList | PUSCH-TimeDomainResourceAllocationList |
| msg3-DeltaPreamble | INTEGER (–1..6) |
| p0-NominalWithGrant | INTEGER (–202..24) |
| ... | |
| } | |
| PUSCH-PowerControl ::= | SEQUENCE { |
| tpc-Accumulation | ENUMERATED { disabled } |
| msg3-Alpha | Alpha |
| p0-NominalWithoutGrant | INTEGER (–202..24) |
| p0-AlphaSets | SEQUENCE (SIZE (1..maxNrofP0-PUSCH-AlphaSets)) OF P0-PUSCH-AlphaSet |
| pathlossReferenceRSToAddModList | SEQUENCE (SIZE (1..maxNrofPUSCH-PathlossReferenceRSs)) OF PUSCH-PathlossReferenceRS |
| pathlossReferenceRSToReleaseList | SEQUENCE (SIZE (1..maxNrofPUSCH-PathlossReferenceRSs)) OF PUSCH-PathlossReferenceRS-Id |
| twoPUSCH-PC-AdjustmentStates | ENUMERATED {twoStates} |
| deltaMCS | ENUMERATED {enabled} |
| sri-PUSCH-MappingToAddModList | SEQUENCE (SIZE (1..maxNrofSRI-PUSCH-Mappings)) OF SRI-PUSCH-PowerControl |
| sri-PUSCH-MappingToReleaseList | SEQUENCE (SIZE (1..maxNrofSRI-PUSCH-Mappings)) OF SRI-PUSCH-PowerControlId |
| } | |

Through a method as described above, a terminal may determine or calculate PUSCH transmission power and transmit a PUSCH by using determined or calculated PUSCH transmission power.

Hereinafter, for convenience of a description, a power control method is described based on a case in which a terminal performs PUCCH transmission. Of course, a corresponding method may be extended and applied to other uplink control channel supported in a wireless communication system.

Specifically, when a terminal performs PUCCH transmission in an active UL BWP (b) of a carrier (f) of a primary cell (or a secondary cell) (c) by using a PUCCH power control adjustment state based on index l, a terminal may determine PUCCH transmission power $P_{PUCCH,b,f,c}(i,q_u,q_d,l)$ (dBm) at a PUCCH transmission occasion (i) based on the following Equation 4.

[Equation 4]

$$P_{PUCCH,b,f,c}(i,q_u,q_d,l) = \min \begin{cases} P_{CMAX,f,c}(i), \\ P_{O\_PUCCH,b,f,c}(q_u) + 10\log_{10}(2^\mu \cdot M_{RB,b,f,c}^{PUCCH}(i)) + \\ PL_{b,f,c}(q_d) + \Delta_{F\_PUCCH}(F) + \Delta_{TF,b,f,c}(i) + g_{b,f,c}(i,l) \end{cases}$$

In Equation 4, q_d represents an index for an open-loop power control parameter (e.g., $P_O$, etc.) and up to 8 parameter values may be configured per cell. Index q_d represents an index of a DL RS resource for pathloss (PL) measurement (e.g., $PL_{b,f,c}(q_d)$) and up to 4 measured values may be configured per cell. Index 1 represents an index for a closed-loop power control process and up to 2 processes may be configured per cell.

Specifically, as $P_O$ (e.g., $P_{O\_PUCCH,b,f,c}(q_u)$) is a parameter which is broadcast as part of system information, it may represent target reception power from reception. A corresponding $P_O$ value may be configured by considering throughput of a terminal, capacity of a cell, noise and/or interference, etc. In addition, $P_{CMAX,f,c}(i)$ may represent configured UE transmit power. In an example, the configured UE transmit power may be interpreted as 'configured maximum UE output power' defined in 3GPP TS 38.101-1 and/or TS38.101-2. In addition, $M_{RB,b,f,c}^{PUCCH}(i)$ may represent bandwidth of PUCCH resource allocation expressed as the number of resource blocks (RB) for a PUCCH transmission occasion based on a subcarrier spacing (p). In addition, a delta function (e.g., $\Delta_{F\_PUCCH}(F)$, $\Delta_{TF,b,f,c}(i)$) may be configured by considering a PUCCH format (e.g., PUCCH formats 0, 1, 2, 3, 4, etc.). In addition, $g_{b,f,c}(i,l)$ related to a PUCCH power control adjustment state may be configured or indicated based on a TPC command field of DCI (e.g., DCI format 1_0, DCI format 1_1, DCI format 2_2, etc.) received or detected by a terminal.

In this case, a specific RRC parameter (e.g., PUCCH-SpatialRelationInfo, etc.) and/or a specific MAC-CE command (e.g., PUCCH spatial relation Activation/Deactivation, etc.) may be used to activate or deactivate a linkage between a PUCCH resource and the above-described index q_u, q_d, l. In an example, a PUCCH spatial relation Activation/Deactivation command in MAC-CE may activate or deactivate a linkage between a PUCCH resource and the above-described index q_u, q_d, l based on a RRC parameter, PUCCH-SpatialRelationInfo. In other words, the above-described index q_u, q_d, l, etc. may be associated with a beam, a panel and/or a spatial domain transmission filter, etc. based on specific information. Thereby, PUCCH transmission power control in a unit of a beam, a panel and/or a spatial domain transmission filter may be performed.

Parameters and/or information for the above-described PUCCH power control may be configured individually (i.e., independently) per BWP. In this case, corresponding parameters and/or information may be configured or indicated by higher layer signaling (e.g., RRC signaling, MAC-CE, etc.) and/or DCI, etc. In an example, a parameter and/or information for PUCCH power control may be transmitted through RRC signaling PUCCH-ConfigCommon, PUCCH-PowerControl, etc. and PUCCH-ConfigCommon, PUCCH-PowerControl may be configured as in the following Equation 9.

TABLE 9

| | |
|---|---|
| PUCCH-ConfigCommon ::= | SEQUENCE { |
| pucch-ResourceCommon | INTEGER (0..15) |
| pucch-GroupHopping | ENUMERATED { neither, enable, disable }, |
| hoppingId | INTEGER (0..1023) |
| p0-nominal | INTEGER (−202..24) |
| ... | |
| } | |
| PUCCH-PowerControl ::= | SEQUENCE { |
| deltaF-PUCCH-f0 | INTEGER (−16..15) |
| deltaF-PUCCH-f1 | INTEGER (−16..15) |
| deltaF-PUCCH-f2 | INTEGER (−16..15) |
| deltaF-PUCCH-f3 | INTEGER (−16..15) |
| deltaF-PUCCH-f4 | INTEGER (−16..15) |
| p0-Set | SEQUENCE (SIZE (1..maxNrofPUCCH-P0-PerSet)) OF P0-PUCCH |
| pathlossReferenceRSs | SEQUENCE (SIZE (1..maxNrofPUCCH-PathlossReferenceRSs)) |
| OF PUCCH-PathlossReferenceRS | |
| twoPUCCH-PC-AdjustmentStates | ENUMERATED {twoStates} |
| ... | |
| } | |
| P0-PUCCH ::= | SEQUENCE { |
| p0-PUCCH-Id | P0-PUCCH-Id, |
| p0-PUCCH-Value | INTEGER (−16..15) |
| } | |
| P0-PUCCH-Id ::= | INTEGER (1..8) |
| PUCCH-PathlossReferenceRS ::= | SEQUENCE { |
| pucch-PathlossReferenceRS-Id | PUCCH-PathlossReferenceRS-Id, |
| referenceSignal | CHOICE { |
| ssb-Index | SSB-Index, |
| csi-RS-Index | NZP-CSI-RS-ResourceId |
| } | |
| } | |

Through a method as described above, a terminal may determine or calculate PUCCH transmission power and transmit a PUCCH by using determined or calculated PUCCH transmission power.

Multi-TRP PUSCH Transmission Method

Hereinafter, in methods proposed in the present disclosure, DL MTRP-URLLC means that multiple TRPs transmit the same data/DCI by using a different layer/time/frequency resource. For example, TRP 1 transmits the same data/DCI in resource 1 and TRP 2 transmits the same data/DCI in resource 2. A UE configured with a DL MTRP-URLLC transmission method receives the same data/DCI by using a different layer/time/frequency resource. Here, a UE is indicated from a base station for which QCL RS/type (i.e., a DL TCI state) should be used in a layer/time/frequency resource receiving the same data/DCI. For example, when the same data/DCI is received in resource 1 and resource 2, a DL TCI state used in resource 1 and a DL TCI state used in resource 2 are indicated. A UE may achieve high reliability because it receives the same data/DCI through resource 1 and resource 2. Such DL MTRP URLLC may be applied to a PDSCH/a PDCCH.

Conversely, UL MTRP-URLLC means that multiple TRPs receive the same data/UCI from a UE by using a different layer/time/frequency resource. For example, after TRP 1 receives the same data/UCI from a UE in resource 1 and TRP 2 receives the same data/UCI from a UE in resource 2, reception data/UCI is shared through a backhaul link connected between TRPs. A UE configured with a UL MTRP-URLLC transmission method transmits the same data/UCI by using a different layer/time/frequency resource. Here, a UE is indicated from a base station for which Tx beam and which Tx power (i.e., a UL TCI state) should be used in a layer/time/frequency resource transmitting the same data/DCI. For example, when the same data/UCI is transmitted in resource 1 and resource 2, a UL TCI state used in resource 1 and a UL TCI state used in resource 2 are indicated. Such UL MTRP URLLC may be applied to a PUSCH/a PUCCH.

In addition, hereinafter, in methods proposed in the present disclosure, when a specific TCI state (or TCI) is used (/mapped) in receiving data/DCI/UCI for any frequency/time/space resource, it means as follows. For a DL, it may mean that a channel is estimated from a DMRS by using a QCL type and a QCL RS indicated by a corresponding TCI state in a corresponding frequency/time/space resource and data/DCI is received/demodulated with an estimated channel. For a UL, it may mean that a DMRS and data/UCI are transmitted/modulated by using a Tx beam and/or Tx power indicated by a corresponding TCI state in that frequency/time/space resource.

The UL TCI state includes Tx beam or Tx power information of a UE. In addition, spatial relation information, etc. instead of a TCI state may be configured to a UE through other parameter, etc. An UL TCI state may be directly indicated to UL grant DCI or may be indirectly indicated to mean spatial relation information of an SRS resource indicated by an SRI field of UL grant DCI. Alternatively, it may mean an open loop (OL) Tx power control parameter connected to a value indicated by an SRI field of UL grant DCI (e.g., j: an index for open loop parameter Po and alpha (up to 32 parameter value sets per cell), q_d: an index of a DL RS resource for PL (pathloss) measurement (up to 4 measurement per cell), l: a closed loop power control process index (up to 2 processes per cell)).

On the other hand, MTRP-eMBB means that multiple TRPs transmit different data by using a different layer/time/frequency. A UE configured with a MTRP-eMBB transmission method receives an indication on multiple TCI states through DCI and assumes that data received by using a QCL RS of each TCI state is different data.

In addition, a UE may grasp whether of MTRP URLLC transmission/reception or MTRP eMBB transmission/reception by separately classifying RNTI for MTRP-URLLC and RNTI for MTRP-eMBB and using them. In other words, when CRC masking of DCI is performed by using RNTI for URLLC, a UE is considered as URLLC transmission and when CRC masking of DCI is performed by using RNTI for eMBB, a UE is considered as eMBB transmission. Alternatively, a base station may configure MTRP URLLC transmission/reception or may configure TRP eMBB transmission/reception to a UE through other new signaling.

In a description of the present disclosure, it is described by assuming cooperative transmission/reception between 2 TRPs for convenience of a description, but a method proposed in the present disclosure may be also extended and applied in 3 or more multi-TRP environments and in addition, it may be also extended and applied in multi-panel environments (i.e., by matching a TRP to a panel). In addition, a different TRP may be recognized as a different TCI state to a UE. Accordingly, when a UE receives/transmits data/DCI/UCI by using TCI state 1, it means that data/DCI/UCI is received/transmitted from/to TRP 1.

A proposal of the present disclosure may be utilized in a situation where MTRP cooperatively transmits a PDCCH (repetitively or partitively transmitting the same PDCCH) and some proposals may be also utilized in a situation where MTRP cooperatively transmits a PDSCH or cooperatively receives a PUSCH/a PUCCH.

In addition, hereinafter, in the present document, when a UE repetitively transmits the same PUSCH so that a plurality of base stations (i.e., MTRP) can receive it, it may mean that the same data is transmitted through multiple PUSCHs. Here, each PUSCH may be transmitted by being optimized to a UL channel of a different TRP. For example, a situation where a UE repetitively transmits the same data through PUSCH 1 and 2 is considered. PUSCH 1 may be transmitted by using UL TCI state 1 for TRP 1 and link adaptation such as a precoder/MCS, etc. may be also transmitted after a value optimized for a channel of TRP 1 is scheduled. PUSCH 2 may be transmitted by using UL TCI state 2 for TRP 2 and link adaptation such as a precoder/MCS, etc. may be also transmitted after a value optimized for a channel of TRP 2 is scheduled. Here, PUSCH 1 and 2 which are repetitively transmitted may be transmitted at a different time to be time division multiplexed (TDM), frequency division multiplexed (FDM) or spatial division multiplexed (SDM).

In addition, hereinafter, in the present disclosure, when a UE partitively transmits the same PUSCH so that a plurality of base stations (i.e., MTRP) receive it, it may mean that one data is transmitted by one PUSCH, and a resource allocated to that PUSCH is transmitted by being partitioned and optimized to a UL channel of a different TRP. For example, it is considered that a UE transmits the same data through 10 symbol PUSCHs. Here, in previous 5 symbols, a PUSCH may be transmitted by using UL TCI state 1 for TRP 1 and link adaptation such as a precoder/MCS, etc. may be also transmitted after a value optimized for a channel of TRP 1 is scheduled. In remaining 5 symbols, a PUSCH may be transmitted by using UL TCI state 2 for TRP 2 and link adaptation such as a precoder/MCS, etc. may be also transmitted after a value optimized for a channel of TRP 2 is scheduled. In the example, transmission for TRP 1 and transmission for TRP 2 are time division multiplexed (TDM) by dividing one PUSCH into time resources, but it may be transmitted by other FDM/SDM method.

Similar to PUSCH transmission, a UE may also repetitively transmit the same PUCCH or may partitively transmit the same PUCCH so that a plurality of base stations (i.e., MTRP) receive a PUCCH.

A proposal of the present disclosure may be extended and applied to a variety of channels such as a PUSCH/a PUCCH/a PDSCH/a PDCCH, etc.

In Rel-16 eNR MIMO, standardization for single DCI based PDSCH transmission and multi DCI based PDSCH transmission is performed for multi-TRP PDSCH transmission. In Rel-17 FeNR MIMO, standardization for multi-TRP transmission (e.g., a PDCCH, a PUCCH, a PUSCH, etc.) excluding a PDSCH will be performed (hereinafter, multi-TRP is abbreviated to M-TRP, MTRP, etc.).

For M-TRP PUSCH transmission, SRS transmission of a terminal needs to be preceded for UL channel estimation and link adaptation before PUSCH scheduling of a base station. But, according to an SRS structure of Rel-15 NR, there is a limit that only one SRS resource set for a CB (codebook)/a NCB (non-codebook) may be configured respectively (there may be up to 2 resources in an SRS resource set for a CB and there may be up to 4 resources in an SRS resource set for a NCB). Accordingly, there is a limit to SRS configuration/transmission of a terminal for M-TRP PUSCHs.

In addition, when a base station performs M-TRP PUSCH scheduling, single DCI based scheduling and multi DCI based scheduling are possible. But, it is needed to define how information on a PUSCH towards a different TRP (e.g., a TRI (Transmit Rank Indicator), a TPMI (Transmit Precoding Matrix Indicator), CQI) will be included in single or multi DCI.

Based on such a background, the present disclosure proposes an SRS configuration and multi-TRP PUSCH scheduling method for a base station to schedule multi-TRP PUSCH transmission to a terminal and proposes a multi-TRP PUSCH transmission method of a subsequent terminal.

In this document, '/' means 'and' or 'or' or 'and/or' in context. In the present disclosure, an idea is mainly described based on a PUSCH, but it is not limited thereto and the same/a similar method may be applied to a PUCCH configured with a plurality of TOs (Transmission Occasion). In addition, the following proposal is described based on a case in which a PUSCH is transmitted by DCI for a plurality of TOs, but it may be applied when a corresponding PUSCH is transmitted at a plurality of TOs if PUSCH transmission is performed per specific cycle (e.g., a semi-persistent PUSCH) or if a PUSCH is transmitted in a corresponding resource (e.g., a grant-free PUSCH) when a terminal is necessary after a UL resource which may transmit a PUSCH (for URLLC or for voice service) is (semi-statically) allocated to a terminal.

For a base station to schedule a PUSCH towards 2 or more multi-TRPs to a terminal, SRS transmission from a terminal for UL channel estimation and UL link adaptation needs to be preceded. Such SRS transmission may be performed in a form that multi-TRPs overhear one transmission, but when a beam-based operation or a FR2-based system (refer to Table 2) is considered, a terminal needs to separately transmit an SRS towards each TRP. An SRS configuration/transmission method for SRS transmission towards the each TRP may be classified into two methods as follows.

Method 1: An implicit SRS configuration method for SRS transmission towards each TRP (or an SRS configuration method towards a different TRP through a plurality of SRS resource sets)

Unlike an SRS resource set configuration of Rel-15 limited to 1 for codebook (CB) usage and non-codebook (NCB) usage respectively, 2 or more SRS resource sets may be configured for CB usage and NCB usage, respectively. Accordingly, different SRS resource sets for each usage may include SRS resources towards a different TRP. In other words, 2 or more SRS resource sets for a CB may be configured and each SRS resource set may correspond to a different TRP. Likewise, 2 or more SRS resource sets for an NCB may be configured and each SRS resource set may correspond to a different TRP.

According to method 1, a power control parameter is configured for an SRS resource set level in the existing SRS configuration structure, so there is an advantage that a power control operation may be performed per TRP. In addition, when a different panel corresponds to a different SRS resource set (e.g., when a different panel-ID (P-ID) is configured for a different SRS resource set), there is an advantage that a transmission panel may be freely configured/indicated for an SRS resource set towards a different TRP.

Method 2: An explicit SRS configuration method for SRS transmission towards each TRP (or an SRS configuration method towards a different TRP through a single SRS resource set)

For a usage (i.e., 'usage') parameter which defines/configures usage in an SRS resource set configuration, a parameter for a M-TRP PUSCH (e.g., 'm-trpPUSCH') (or, hybrid (e.g., 'hybrid'), here, meaning of hybrid represents a feature that a codebook and a nonCodebook are hybridized and exist in an SRS resource set) may be newly added/defined. SRS resources towards a different TRP may be configured in an SRS resource set for a corresponding M-TRP PUSCH. Here, all SRS resources configured in a corresponding SRS resource set may be for a CB or may be for an NCB or SRS resources for a CB and for a NCB may be mixed.

According to method 2, an SRS resource for a CB and for an NCB may be flexibly configured in one SRS resource set and there is an advantage that SRS resources for a CB and for a NCB may be configured to be mixed. Here, there may be a definition/a configuration/a standard in advance for classifying SRS resources for a CB and for an NCB. For example, CB usage may be configured as multi-port SRS resources and NCB usage may be configured as a single-port SRS resource. Meanwhile, for a transmission panel configuration/indication per SRS resource, a P-ID configuration per resource or a P-ID configuration for a spatial relation information (spatialRelationInfo) configuration (or/and a UL TCI configuration) in a resource configuration is needed. However, there is a disadvantage that it is difficult to perform separate power control of different SRS resources towards each TRP.

A proposal is made as follows based on the above-described method 1 and method 2.

Embodiment 1: A base station may configure DL/UL RS (e.g., SSB, CSI-RS, SRS) information that a cell ID (or a TRP ID) is included as spatial relation information of each SRS resource (or each SRS resource set). Accordingly, a terminal may distinguish/recognize which TRP an SRS resource heads towards for a specific SRS resource. For example, when method 1 is applied, i) a reception cell ID (or TRP ID) may be configured in a configuration for an SRS resource set. Alternatively, when method 2 is applied, ii) a reception cell ID (or TRP ID) may be configured in a configuration for an SRS resource.

Through embodiment 1, a terminal may recognize that a specific SRS resource set or an SRS resource is an SRS resource (for UL channel estimation and link adaptation) for M-TRP PUSCH scheduling. A base station may measure a UL channel for each TRP by making a terminal transmit a corresponding SRS resource (e.g., triggering of SRS transmission by DCI) and subsequently, may schedule a M-TRP PUSCH to a terminal. In addition, when a base station performs M-TRP PUSCH scheduling subsequently, the SRS resource set/SRS resource may be indicated as reference by an SRS resource indicator (SRI) field or/and a UL-TCI field (or a specific field in DCI in the following proposals), etc. of corresponding PUSCH scheduling DCI. Accordingly, a terminal may recognize a target TRP for a plurality of scheduled PUSCHs and transmits a PUSCH according to a corresponding SRS configuration (and a configuration for a PUSCH TO).

Embodiment 2: A base station may utilize the following method to schedule a M-TRP PUSCH to a terminal.

Embodiment 2-1: For a parameter configuring UL transmission mode of a terminal (e.g., 'txConfig'), a M-TRP PUSCH configuration excluding a 'codebook' and 'non-Codebook' configuration (e.g., 'm-trpPUSCH' or 'hybrid', here, hybrid means a feature that a codebook and a non-Codebook are hybridized and utilized for PUSCH transmission) may be added/defined. A base station may switch a UL transmission mode of a terminal into a M-TRP PUSCH transmission mode by configuring a configuration of a UL transmission mode of a specific terminal (e.g., 'txConfig') as a M-TRP PUSCH configuration (e.g., 'm-trpPUSCH' or 'hybrid'). Such a method has a feature of semi-static scheduling. It is clear that the 'm-trpPUSCH' or 'hybrid' parameter name may include other name as an example and do not limit a scope of a proposal of the present disclosure.

As described above, as a configuration of a UL transmission mode (e.g., 'txConfig') is configured as a M-TRP PUSCH configuration (e.g., 'm-trpPUSCH' or 'hybrid'), DCI for PUSCH scheduling following this configuration means scheduling of multiple PUSCH Transmission Occasions (TO) towards multiple TRPs. Accordingly, a corresponding DCI field gets information on a plurality of sets for multiple PUSCHs towards multiple TRPs. In other words, a PUSCH set including one or more PUSCH TOs may be scheduled per each TRP. Specifically, for a beam indication of each PUSCH (i.e., for independently indicating a beam per each TRP), a plurality of beams may be configured/indicated through a plurality of SRI (or UL-TCI state) fields by the DCI. In addition, a plurality of timing advance (TA) values for each PUSCH may be configured/indicated/applied by the DCI (i.e., TA is independently configured/indicated per each TRP). In addition, a plurality of power control parameter sets (or processes) for each PUSCH may be configured/indicated/applied by the DCI (i.e., a power control parameter is independently configured/indicated per each TRP). In addition, a plurality of TPMIs (transmit PMI) may be configured/indicated/applied by the DCI to determine a precoder of each PUSCH (i.e., a TPMI is independently configured/indicated per each TRP).

Embodiment 2-2: A base station may separately configure a CORESET or/and a search space set for M-TRP PUSCH scheduling. DCI received by a terminal in a corresponding CORESET or/and search space set may be recognized by a terminal as DCI scheduling M-TRP PUSCHs.

Alternatively, i) a separate DCI format for M-TRP PUSCH scheduling may be defined/configured. And/or ii) as a separate RNTI of a terminal for decoding DCI for M-TRP PUSCH scheduling is defined/configured, a terminal may utilize a corresponding ID (i.e., a RNTI) as a scrambling ID for blind detection. Such a method has an advantage that dynamic scheduling is possible. In other words, for M-TRP PUSCH scheduling, a base station may transmit DCI to a terminal through the above-describe CORESET or/and search space set. Alternatively, for TRP PUSCH scheduling, DCI may be transmitted to a terminal by using the above-described separate DCI format and/or separate RNTI.

When a terminal receives DCI through the separately configured CORESET/search space set or receives DCI of a separate DCI format as in the i) or succeeds in blind detection of DCI through a separate RNTI as in ii), a terminal may recognize/consider that corresponding DCI means scheduling of multiple PUSCH TOs (Transmission Occasion) towards multiple TRPs. In this case, a field of corresponding DCI gets information on a plurality of sets for multiple PUSCHs towards multiple TRPs. Specifically, for a beam indication of each PUSCH (i.e., for independently indicting a beam per each TRP), a plurality of beams may be configured/indicated through a plurality of SRI (or UL-TCI state) fields by the DCI. In addition, a plurality of timing advance (TA) values for each PUSCH may be configured/indicated/applied by the DCI (i.e., TA is independently configured/indicated per each TRP). In addition, a plurality of power control parameter sets (or processes) for each PUSCH may be configured/indicated/applied by the DCI (i.e., a power control parameter is independently configured/indicated per each TRP). In addition, a plurality of TPMIs (transmit PMI) may be configured/indicated/applied by the DCI to determine a precoder of each PUSCH (i.e., a TPMI is independently configured/indicated per each TRP).

Embodiment 3: A method of configuring/indicating a plurality of PUSCH Transmission Occasions (TO) of DCI for the M-TRP PUSCH scheduling and an assumption on a plurality of TOs of a subsequent terminal and a PUSCH transmission method are proposed.

Two SRS resource sets may be configured by method 1 for M-TRP PUSCH scheduling as above or an SRS resource set for M-TRPs (or a 'hybrid' SRS resource set) may be configured by method 2 to perform UL channel estimation/UL link adaptation for M-TRP PUSCH scheduling. Subsequently, a base station may give an indication to a terminal for transmission to a plurality of PUSCH Transmission Occasions (TO) towards multiple TRPs through DCI in the embodiment 2. Such a configuration for each PUSCH TO towards each TRP may be configured/updated by higher layer signaling such as RRC/MAC CE (control element), etc. in advance before M-TRP PUSCH scheduling.

When the configuration/indication for each PUSCH TO towards each TRP is specifically described, a terminal applies a power control (PC) parameter (set) and a Tx beam corresponding to an SRS resource set/SRS resource towards each TRP indicated through a specific field of DCI (e.g., an SRI field, a UL-TCI field) to multiple PUSCH TOs in a specific order (or according to a pre-configured rule). In other words, PUSCH TOs corresponding to each TRP among all PUSCH TOs may be grouped and a PC parameter (set) and a Tx beam for an SRS resource set/an SRS resource corresponding to each PUSCH TO group may be applied.

Here, according to a specific order (or a pre-configured rule), as a TO increases (i.e., in ascending order of indexes of a TO), a PC parameter (set) and a Tx beam corresponding to an SRS resource set/an SRS resource towards the each TRP may be alternatively (i.e., circularly, sequentially) applied. Here, as a TO increases (i.e., in ascending order of indexes of a TO), an SRI field for each TRP is alternatively (i.e., circularly, sequentially) mapped, so a PC parameter (set) and a Tx beam corresponding to an SRS resource set/an SRS resource may be alternatively (i.e., circularly, sequentially) applied. For example, it is assumed that there are 4 PUSCH TOs for PUSCH transmission for 2 TRPs. In addition, it is assumed that TRP 1 corresponds to SRS resource set/SRS resource 1 and TRP 2 corresponds to SRS resource set/SRS resource 2. In this case, a PC parameter (set) and a Tx beam for SRS resource set/SRS resource 1 may be applied to a first PUSCH TO, a PC parameter (set) and a Tx beam for SRS resource set/SRS resource 2 may be applied to a second PUSCH TO, a PC parameter (set) and a Tx beam for SRS resource set/SRS resource 1 may be applied to a third PUSCH TO and a PC parameter (set) and a Tx beam for SRS resource set/SRS resource 2 may be applied to a fourth PUSCH TO.

Alternatively, when N PUSCH TOs are configured, grouping may be performed per adjacent ceil(N/2) (ceil(x) is the minimum integer not smaller than x) or floor(N/2) (floor(x) is the maximum integer not greater than x) TOs. And, a PC parameter (set) and a Tx beam corresponding to an SRS resource set/an SRS resource towards each TO group and each TRP may be circularly or sequentially mapped. In other words, a PC parameter (set) and a Tx beam corresponding to an SRS resource set/an SRS resource for each TRP may be circularly or sequentially mapped TRP per TO group (i.e., in ascending order of indexes of a TO group). Here, as an SRI field for each TRP is circularly or sequentially mapped per TO group (i.e., in ascending order of indexes of a TO group), a PC parameter (set) and a Tx beam corresponding to an SRS resource set/an SRS resource may be circularly or sequentially mapped. For example, it is assumed that there are 6 PUSCH TOs for PUSCH transmission for 2 TRPs. In addition, it is assumed that TRP 1 corresponds to SRS resource set/SRS resource 1 and TRP 2 corresponds to SRS resource set/SRS resource 2. In this case, a PC parameter (set) and a Tx beam for SRS resource set/SRS resource 1 may be applied to a first PUSCH TO group (a first, second, third PUSCH TO) and a PC parameter (set) and a Tx beam for SRS resource set/SRS resource 2 may be applied to a second PUSCH TO group (a fourth, fifth, sixth PUSCH TO).

In addition, by the same method, a plurality of precoders indicated through a specific field of the DCI (i.e., an SRI field, a TPMI field) may be also applied to multiple PUSCH TOs in a specific order (or according to a pre-configured rule).

Here, according to a specific order (or a pre-configured rule), as a TO increases (i.e., in ascending order of indexes of a TO), a precoder towards the each TRP may be alternatively (i.e., circularly, sequentially) applied. Here, as a TO increases (i.e., in ascending order of indexes of a TO), an SRI corresponding to each TRP is alternatively (i.e., circularly, sequentially) mapped, so a precoder for each TRP may be alternatively (i.e., circularly, sequentially) applied. For example, it is assumed that there are 4 PUSCH TOs for PUSCH transmission for 2 TRPs. In addition, it is assumed that TRP 1 corresponds to precoder 1 and TRP 2 corresponds to precoder 2. In this case, precoder 1 may be applied to a first PUSCH TO, precoder 2 may be applied to a second PUSCH TO, precoder 1 may be applied to a third PUSCH TO and precoder 2 may be applied to a fourth PUSCH TO.

Alternatively, when N PUSCH TOs are configured, grouping may be performed per adjacent floor(N/2) or ceil(N/2) TOs. And, a precoder towards each TO group and each TRP may be circularly or sequentially mapped. Here, a precoder for each TRP may be circularly or sequentially mapped per TO group (i.e., in ascending order of indexes of a TO group). Here, as an SRI field corresponding to each TRP is circularly or sequentially mapped per TO group (i.e., in ascending order of indexes of a TO group), a precoder for each TRP may be circularly or sequentially mapped. For example, it is assumed that there are 6 PUSCH TOs for PUSCH transmission for 2 TRPs. In addition, it is assumed that TRP 1 corresponds to precoder 1 and TRP 2 corresponds to precoder 2. In this case, precoder 1 may be applied to a first PUSCH TO group (a first, second, third PUSCH TO) and precoder 2 may be applied to a second PUSCH TO group (a fourth, fifth, sixth PUSCH TO).

As a result of the mapping, a terminal may apply the same PC parameter (set), Tx beam and/or precoder to adjacent TOs included in the same group. In other words, through the operation, a power control parameter (set), a Tx beam and/or a precoder for a plurality of PUSCH TOs scheduled towards a plurality of different TRPs may be configured/indicated by M-TRP PUSCH scheduling DCI of a base station.

In addition, a base station may configure/indicate/update a TA value which will be applied by a terminal for multiple PUSCH TOs towards a plurality of TRPs through higher layer signaling such as RRC, MAC CE before M-TRP PUSCH scheduling. As above, a terminal may apply a configured/indicated/updated TA value to multiple PUSCH TOs in a specific order. In other words, as a PUSCH TO increases (i.e., in ascending order of indexes of a TO), a TA value for the each TRP may be alternatively (i.e., circularly, sequentially) applied. Here, as a PUSCH TO increases (i.e., in ascending order of indexes of a TO), an SRI field corresponding to each TRP is alternatively (i.e., circularly, sequentially) mapped, so a TA value for each TRP may be alternatively (i.e., circularly, sequentially) applied.

Alternatively, when N PUSCH TOs are configured, grouping may be performed per adjacent floor(N/2) or ceil(N/2) TOs. And, a TA value for each TO group and each TRP may be circularly or sequentially mapped. Here, a TA value for each TRP may be circularly or sequentially mapped per TO group (i.e., in ascending order of indexes of a TO group). In other words, as an SRI field corresponding to each TRP is circularly or sequentially mapped per TO group (i.e., in ascending order of indexes of a TO group), a TA value for each TRP may be circularly or sequentially mapped.

In the present disclosure, a TO may mean each channel transmitted at a different time when multiple channels are time division multiplexed (TDM), mean each channel transmitted to a different frequency/RB when multiple channels are frequency division multiplexed (FDM) and mean each channel transmitted to a different layer/beam/DMRS port when multiple channels are spatial division multiplexed (SDM). One TCI state is mapped to each TO. When the same channel is repetitively transmitted (e.g., when a PDCCH, a PDSCH, a PUSCH, a PUCCH are repetitively transmitted), whole DCI/data/UCI is transmitted to one TO and a reception unit increases a success rate of reception by receiving multiple TOs. When one channel is partitively transmitted to multiple TOs, part of DCI/data/UCI is transmitted to one TO and a reception unit may receive whole DCI/data/UCI by collecting partitioned DCI/data/UCI only when it receives all multiple TOs.

Additionally, when the multiple PUSCH TOs are configured/indicated by the number of reception TRPs of M-TRP PUSCHs, a terminal transmits each PUSCH to each TRP. Alternatively, when the multiple PUSCH TOs are configured/indicated by n times the number of reception TRPs of M-TRP PUSCHs, a terminal transmits n PUSCHs to each TRP. Information on the number of times of such PUSCH TOs and time domain/frequency domain resource allocation information may be configured/updated through a higher layer configuration such as RRC/MAC CE, etc. in advance before DCI transmission of a base station for PUSCH scheduling, or may be dynamically indicated through a specific field of scheduling DCI for a PUSCH. In this case, for PUSCH transmission in a PUSCH TO of a subsequent terminal, a PC parameter (set), a Tx (analog) beam, a precoder and a TA configuration/indication of the base station may be applied/utilized.

Embodiment 4: A specific configuration/indication method of a plurality of PC parameters (set), Tx (analog) beams, precoders and TA for a plurality of PUSCH TOs in the Embodiment 3 is proposed.

i) A Method of Configuring a Plurality of TA for a Plurality of PUSCH TOs

A base station may configure/update a plurality of TA values which should be applied by a terminal to a plurality of PUSCH TOs before M-TRP PUSCH scheduling. The TA value may be configured/indicated/updated to a terminal through higher layer signaling such as a MAC CE message (or a RRC message). Here, the number of TA values may be the same as the number of TRPs which take part in M-TRP PUSCH scheduling.

ii) A Method of Configuring/Indicating a Plurality of Tx Beams for a Plurality of PUSCH TOs A base station may configure/update a plurality of Tx beams which should be applied by a terminal to a plurality of PUSCH TOs before M-TRP PUSCH scheduling. Specifically, a base station may configure/update a PUSCH Tx beam which should be applied by a terminal to each PUSCH TO in advance (through RRC/MAC-CE) by linking/connecting/referring a DL RS (e.g., an SSB-RI (rank indicator), a CRI (CSI-RS resource indicator)), a UL RS (e.g., an SRI (SRS resource indicator)) to a PUSCH TO configuration through spatial relation information (e.g., 'spatialRelationInfo') or an uplink TCI (e.g., 'UL-TCI'). Alternatively, as in the method 1 and method 2, a base station may configure/indicate/update a Tx beam which should be applied by a terminal to each PUSCH TO by linking/connecting/referring an SRS resource set/an SRS resource configured/transmitted for UL channel estimation/UL link adaptation to each PUSCH TO before M-TRP PUSCH scheduling.

By another method, a plurality of SRI fields or UL-TCI fields (as many as the number of TOs) may be included for an indication on a Tx beam which should be applied to a plurality of PUSCH TOs in DCI for M-TRP PUSCH scheduling. A dynamic Tx beam indication is possible by indicating a DL RS (e.g., an SSB-RI, a CRI) and a UL RS (e.g., an SRI) for each PUSCH TO through a plurality of SRI fields or UL-TCI fields. Alternatively, although there is one SRI field or UL-TCI field in the DCI, a reference RS (DL/UL RS) for a plurality of Rx beams (as many as the number of TOs) may be linked/connected to a corresponding field (in a form of an ordered pair) through a RRC configuration/description. For example, SRS resource 1 of SRS resource set 1 and SRS resource 1 of SRS resource set 2 may be linked/connected to one codepoint. When the codepoint is indicated by an SRI field in DCI, according to the above-described embodiment 3, as a PUSCH TO increases (in ascending order of indexes of a PUSCH TO), SRS resource 1 of SRS resource set 1 and SRS resource 1 of SRS resource set 2 linked/connected with the codepoint may be alternatively (or circularly, sequentially) mapped to each PUSCH TO. In addition, as described above, it may be grouped in a unit of a plurality of adjacent PUSCH TOs. In this case, as a TO group increases (in ascending order of indexes of a PUSCH TO), SRS resource 1 of SRS resource set 1 and SRS resource 1 of SRS resource set 2 linked/connected with the codepoint may be alternatively (or circularly, sequentially) mapped to each TO group. As above, according to link/connection, it is possible to indicate a plurality of Tx beams for a plurality of PUSCH TOs towards a plurality of TRPs by using one codepoint in one field.

A terminal may recognize a panel which will be utilized for each PUSCH TO transmission through a panel connected with a Tx beam indicated in method ii) for indicating the Tx beam. Alternatively, there may be a panel linked/connected to an SRI field or a UL-TCI field (or each codepoint in a field) in advance by a higher layer (in a form of an ordered pair) and when a corresponding codepoint is indicated by scheduling DCI, a terminal utilizes the panel for each PUSCH TO transmission. Additionally, a transmission panel for each PUSCH TO may be configured/updated through higher layer signaling before DCI scheduling.

Iii) a Method of Configuring/Indicating a Plurality of PC Parameters for a Plurality of PUSCH TOs A base station may configure/update a plurality of PC parameters (set) which should be applied by a terminal to a plurality of PUSCH TOs before M-TRP PUSCH scheduling through higher layer signaling (e.g., RRC/MAC-CE, etc.). For example, as in method 1 and method 2, a base station may defined/configure/indicate/update a PC parameter which should be applied by a terminal to each PUSCH TO by linking/connecting/referring an SRS resource set/an SRS resource configured for UL channel estimation/UL link adaptation before M-TRP PUSCH scheduling to each PUSCH TO.

By another method, a plurality of SRI fields or UL-TCI fields in DCI may be defined as in the method ii). And, a PC parameter (set) corresponding to a PUSCH TO towards each TRP may be linked/connected to each field in the DCI through a RRC configuration/description. Accordingly, as a specific codepoint of a specific SRI field or UL-TCI field is indicated in scheduling DCI, a terminal may recognize a PC parameter (set) which will be applied for each TO. For example, a plurality of first PC parameters (set) corresponding to a plurality of codepoints which may be indicated in a first SRI field (or UL-TCI field) in DCI and a plurality of second PC parameters (set) corresponding to a plurality of codepoints which may be indicated in a second SRI field (or UL-TCI field) in DCI may be configured by higher layer signaling such as RRC, etc. And, a specific PC parameter (set) among a plurality of first PC parameters (set) may be indicated by a codepoint indicated in a first SRI field in DCI (corresponding to PUSCH TO 1) and a specific PC parameter (set) among a plurality of second PC parameters (set) may be indicated by a codepoint indicated in a second SRI field (corresponding to PUSCH TO 2). Accordingly, a terminal may recognize a PC parameter (set) applied to each PUSCH TO.

Likewise, as in ii), there may be one SRI field or UL-TCI field in DCI. In this case, the same terminal operation is possible by linking/connecting a PC parameter (set) corresponding to each PUSCH TO to corresponding one field (in a form of an ordered pair) through a RRC configuration/description. For example, an ordered pair such as {PC parameter (set) 1, PC parameter (set) 2, PC parameter (set) 3}, {PC parameter (set) 4, PC parameter (set) 1, PC parameter (set) 2}, etc. may be configured by higher layer signaling such as a RRC, etc. and any one of the ordered pairs may be indicated as a codepoint in one SRI field or UL-TCI field in DCI.

Here, a PC parameter (set) corresponding to the each PUSCH TO may include at least one or more of an open-loop power control parameter $P_O$, an alpha ($\alpha$), a pathloss reference RS (i.e., a reference RS resource index for pathloss measurement) and/or a closed-loop parameter, a closed-loop index.

A codepoint of an SRI field may be differently defined respectively for a case in which M-TRP PUSCH repetition transmission is enabled by a specific condition or a specific signal and a case in which M-TRP PUSCH repetition transmission is disabled. Specifically, this method may be applied to a case in which whether M-TRP PUSCH repetition transmission is enabled/disabled may be indicated by a MAC level or dynamically (e.g., through DCI, etc.). For example, when M-TRP PUSCH repetition transmission is disabled, a codepoint of an SRI field may be configured/defined as one Tx beam reference DL/UL RS (e.g., an SRS resource, a CSI-RS, an SSB) and/or one power control parameter set in the same way as before. In other words, one Tx beam reference DL/UL RS and/or one power control parameter set may be configured/defined to be connected/mapped to one codepoint.

On the other hand, when M-TRP PUSCH repetition transmission is enabled, a codepoint of an SRI field may be configured/defined as one Tx beam reference DL/UL RS (e.g., an SRS resource, a CSI-RS, an SSB) and/or a plurality of (e.g., 2) power control parameter sets. In other words, one Tx beam reference DL/UL RS and/or a plurality of power control parameter sets may be configured/defined to be connected/mapped to one codepoint. In this case, a Tx beam is fixed according to a PUSCH TO configuration/indication, but one of a plurality of PC (power control) parameter sets may be applied to each TO.

Alternatively, when M-TRP PUSCH repetition transmission is enabled, a codepoint of an SRI field may be configured/defined as a plurality of (e.g., 2) Tx beam reference DL/UL RSs (e.g., an SRS resource, a CSI-RS, an SSB) and/or a plurality of (e.g., 2) power control parameter sets. In other words, a plurality of Tx beam reference DL/UL RSs and/or a plurality of power control parameter sets may be configured/defined to be connected/mapped to one codepoint. In this case, one of a plurality of Tx beam reference DL/UL RSs (e.g., an SRS resource, a CSI-RS, an SSB) and PC parameter sets may be applied to each TO according to a PUSCH TO configuration/indication.

A terminal may be configured with each SRI codepoint value from a base station through RRS signaling. When M-TRP PUSCH repetition transmission is disabled/enabled, a different SRI codepoint value may be configured for each. In other words, as M-TRP PUSCH repetition transmission is disabled/enabled, a different Tx beam reference RS or/and PC parameter set connected/mapped to each SRI codepoint may be configured.

In this case, according to whether M-TRP PUSCH repetition transmission is disabled/enabled, a terminal may use an SRI codepoint value corresponding thereto. In other words, according to whether M-TRP PUSCH repetition transmission is performed, a terminal may use a Tx beam reference RS or/and a PC parameter set connected/mapped to a corresponding SRI codepoint value.

In addition, an SRI codepoint value for a case in which M-TRP PUSCH repetition transmission is enabled may be configured as a superset including a value of (a Tx beam reference RS and/or a PC parameter set connected/mapped to) an SRI codepoint for a case of being disabled. In other words, a Tx beam reference RS and/or a PC parameter set connected/mapped to an SRI codepoint value for a case in which M-TRP PUSCH repetition transmission is enabled may include a Tx beam reference RS and/or a PC parameter set connected/mapped to an SRI codepoint value for a case of being disabled. For example, for codepoint 0 of an SRI field, when M-TRP PUSCH repetition transmission is disabled, it may be configured as DL/UL RS index 0 or PC parameter set index 0 (for Tx beam reference) and when TRP PUSCH repetition transmission is enabled, it may be configured as DL/UL RS index 0, DL/UL RS index 1, PC parameter set index 0 or PC parameter set index 1.

In the above-described description, an SRI field may be replaced with a UL TCI state field or/and a DL/UL unified TCI state field. As the DL/UL unified TCI state field is used, a spatial relation reference RS (e.g., a DL/UL RS) or/and a QCL type-D RS of a TCI state having a specific identifier (ID) may be used as a reference RS of a DL reception beam and a reference RS of a UL transmission beam.

iv) A Method of Configuring/Indicating a Plurality of Precoders for a Plurality of PUSCH TOs (e.g., a TPMI Indication, an SRI(s) Indication)

In the existing NR system, a 'codebook' and a 'nonCodebook' may be semi-statically configured for 'txConfig', a parameter configuring a UL transmission mode of a terminal. A field that a base station transmits a PUSCH precoder to a terminal (e.g., a TPMI field, an SRI field) may be variable according to a corresponding configuration. According to the present disclosure, in an example (including a purpose other than M-TRP PUSCH transmission), a UL transmission mode referred to as 'm-trpPUSCH' (or 'hybrid') may be configured in 'txConfig'. A method of indicating a precoder of PUSCH scheduling DCI by a corresponding configuration (or a method of indicating each precoder of M-TRP PUSCHs) is also proposed below. In other words, as a method for indicating a precoder of M-TRP PUSCHs, a method of indicating a precoder is proposed below by dividing cases into a case when a plurality of SRS resource sets/SRS resources transmitted for UL channel estimation/UL link adaptation of each TRP are 1) entirely SRSs for a CB, 2) entirely SRSs for a NCB and 3) mixed with SRSs for a CB and a NCB.

When all are SRSs for a CB

As the simplest method, as many TPMI fields as the number of PUSCH TOs may be variable for M-TRP scheduling DCI. In other words, the number of TPMI fields may be changed according to the number of PUSCH TOs. However, it has a disadvantage that a DCI overhead indiscriminately increases.

Therefore, a TPMI field in DCI is maintained as one field as it is and an operation is proposed that a TRI/TPMI value indicated by a TPMI field is shared between PUSCH TOs based on a specific rule (rule-based) (i.e., a precoder corresponding to a TPMI value is split and applied to a Tx beam corresponding to each PUSCH TO). Such an operation may be applied to a transmission scheme that a layer is shared per PUSCH TO in a data layer of all M-TRP PUSCHs. For example, when there are 2 PUSCH TOs and PMI=2 of rank 4 is indicated, (rank=2) a first and second precoding vector of PMI=2 may be applied to a Tx beam of a first TO and remaining vectors may be applied to a Tx beam of other TO.

Here, as a mapping relation between a PUSCH TO and a Tx beam/PC (power control) is decided, a mapping relation between a PUSCH TO and a precoding vector may be also established for a precoding vector. For example, for an operation of sharing all PUSCH layers between each PUSCH TO, a partial coherent codebook or a non-coherent codebook may be used for a TPMI indication. In addition, when a total of PUSCH layers exceed 4 ranks, a DL 8 port codebook of LTE/NR may be used to support an operation that a PUSCH TO shares a total of layers.

Alternatively, for the number of layers shared by each TRP or PUSCH TO, the maximum ranks per TRP or per PUSCH TO may be limited (e.g., 2 ranks). In this case, an accurate rank and precoder may be indicated by configuring as many TRI+TPMI fields as the number of each PUSCH TO for scheduling in a DCI payload. In addition, waste of the number of bits of a corresponding field may be reduced. For example, it may be configured with {TRI_1+TPMI_1} for TRP 1 PUSCH TO+{TRI_2+TPMI_2} for TRP 2 PUSCH TO in DCI. As such, when a plurality of TOs share a vector of a precoder indicated by a TPMI, each TO may symmetrically share (the same number of) a precoding vector, or may asymmetrically share a precoding vector (i.e., a different number, e.g., for rank 4, 3+1/1+3).

Here, for a data layer of all M-TRP PUSCHs, there may be a data layer overlapped per PUSCH TO. In this case, for an overlapped layer, what number-th layer it is or what number-th vector it is may be configured/indicated in advance so that the same precoding vector will be applied to each TO. For example, when data layer 1, 2, 3 are transmitted in a first PUSCH TO and data layer 3, 4 are transmitted in a second PUSCH TO, a base station configures/indicates/updates layer 3 as an overlapped layer or precoding layer in advance before scheduling, so a terminal operation may be defined/configured.

Regarding the above-described operation sharing a layer per each PUSCH TO, when configuring an SRS resource set/an SRS resource for M-TRP PUSCH scheduling, there may be an effect that the number of layers towards a specific TRP is pre-configured according to a configuration of the number of ports in an SRS resource configuration for a CB. Alternatively, in a pre-configuration of a PUSCH TO or DCI scheduling, the number of layers towards each TRP may be configured/indicated.

Alternatively, for a data layer of a total of M-TRP PUSCHs, an operation may be performed in a repetition form that each PUSCH TO transmits all data layers, respectively. In this case, a TPMI field indicated in DCI may be applied to a Tx beam corresponding to a specific base TO. And, a different precoding vector which orthogonalized a precoder indicated by a TPMI may be applied to a Tx beam corresponding to a non-base TO. Such an orthogonalization process may be formulaically defined in advance. Alternatively, an orthogonalization process may be defined as being determined as a TPMI existing in a null space of a TPMI precoder indicated in the DCI among TPMI candidates. In another example, a base station may configure/indicate in advance an offset value for a TPMI value of other TO based on a TPMI index of a base TO and a TPMI value for a TO except for a base TO may be configured/indicated by an offset and a TPMI index of a base TO. In another example, a transmission panel and/or a transmission beam is different per each TO, so a base TPMI field may be equally applied to all TOs.

For the above-described operation that a total of data layers are shared per M-TRP PUSCH TO and an operation that each PUSCH TO repeats a total of data layers, which operation of two operations should be performed by a terminal may be indicated by a pre-configuration/update of a base station (i.e., RRC/MAC signaling). Alternatively, switching of the two operations may be indicated by a specific field of M-TRP PUSCH scheduling DCI.

When all are SRSs for an NCB

For the existing NR, a value of the maximum number of layers (Lmax) may be configured by UL maximum layer capability of a terminal or a configuration of the maximum layer (e.g., maxMIMO-Layers). And, a value of an SRI field in DCI for NCB PUSCH scheduling is changed by a value of the maximum number of corresponding layers and the number of SRS resources in an SRS resource set for a CB. In the present disclosure, an operation that each PUSCH TO shares the Lmax value or a Lmax value for each PUSCH TO is respectively configured is proposed.

First, a base station may configure a sum of SRS resource values configured for all PUSCH TOs to be a Lmax value by configuring/defining the number of SRS resources (configured for UL channel estimation/UL link adaptation) corresponding to each PUSCH TO. Through such an operation, each PUSCH TO may share the Lmax value. In addition, an enhanced operation is possible while maintaining a bit field of an SRI field for the existing NCB as it is. In addition, a base station and a terminal may have a common understanding of which PUSCH TO each RSR resource corresponds to through embodiment 1 and 3, so there is an advantage that ambiguity does not occur.

Next, a base station may respectively configure/define a Lmax value corresponding to each PUSCH TO by another method. Through such a method, a base station may indicate SRI(s) corresponding to each PUSCH TO (e.g., SRI(s) for the total number of layers combining Lmax 1 and Lmax 2) through DCI. In this case, when indicating an SRI field for each PUSCH TO, an SRI for any one TO may not be indicated at all, so there is an advantage that single-TRP transmission becomes possible (e.g., it becomes a single-TRP PUSCH towards TRP 2 when an indication is performed in Lmax 2, not in Lmax 1). Here, when an SRI for any one TO is not indicated, it may mean that corresponding DCI includes only a single SRI field. Alternatively, when an SRI for any one TO is not indicated, it may mean that there are a plurality of SRI fields in corresponding DCI, but a specific codepoint configuring a corresponding SRI field to be disabled/off is indicated by any one SRI field of them. In this case, a PUSCH for each TO may be transmitted based on an SRS resource in an SRS resource set related to the each TO, i.e., identified by an enabled SRI field (i.e., an SRI field indicating a codepoint other than a specific codepoint for configuration to be disabled/off).

Additionally, SRI(s) for a base PUSCH TO may be indicated through an SRI field and SRI(s) for a TO, not a base PUSCH TO, may be indicated by SRS resources having the same index. For example, when a n-th SRS resource is indicated in an SRS resource set for a NCB corresponding to a base PUSCH TO, a n-th SRS resource may be indicated in an SRS resource set for an NCB corresponding to a corresponding TO also in other TO(s). Here, it is needed to always satisfy a condition that the number of SRS resources selected in a base TO is the same as the number of SRS resources selected in other TO. Through such an operation, an SRS resource selection for multiple TOs may be jointly indicated in one SRI field, so there is an advantage that a bit field size of an SRI field may be reduced.

When an SRS for a CB and an SRS for an NCB are Mixed

When the UL transmission mode called 'm-trpPUSCH' (or 'hybrid') (e.g., 'txConfig') is configured, or when M-TRP PUSCH scheduling is performed based on an SRS resource set/SRS resource configuration that SRS resources for a CB and for a NCB are mixed, the following operation between a base station and a terminal is possible.

Based on the method 1 and method 2, a base station may configure only one SRS resource in an SRS resource set for a CB to a terminal. Here, an SRI field of DCI for M-TRP (or hybrid) PUSCH scheduling may be mapped to SRS resources in an SRS resource set for a NCB and a TPMI field of corresponding DCI may be defined for a CB. In other words, an SRI field for an SRI indication for an NCB and a TPMI field for a precoder indication for a CB may simultaneously exist in DCI. Through such an operation, a terminal may respectively indicate a precoder (/Tx (analog) beam) for a CB/for a NCB which will be applied to each PUSCH TO through DCI.

v) A Method of Configuring/Indicating a Plurality of MCSs for a Plurality of PUSCH TOs For M-TRP scheduling DCI, a MCS field may be variable by the number of PUSCH TOs. However, it has a disadvantage that a DCI overhead indiscriminately increases. Therefore, a MCS for a specific base PUSCH TO may be dynamically indicated through a MCS field of the existing DCI. A MCS offset value from a PUSCH TO MCS value which may become a corresponding standard may be configured by higher layer signaling such as RRC/MAC-CE, etc. Accordingly, other TO MCS other than a base PUSCH TO may be configured/indicated to a terminal as a base MCS+offset value. Each MCS value may be used for data transmission towards each TRP and is characterized by being mapped to a different PUSCH TO.

Alternatively, like a form that two MCSs are indicated per codeword when indicating a MCS of a base station in the existing LTE system, a base station may simply indicate as many MCSs as the number of PUSCH TOs for each TRP.

For the each embodiment, it is obvious that each of different methods may be independently applied/utilized for an operation between a base station and a terminal and in addition, may be applied/utilized in a combination form of one or more specific embodiments and specific method.

Figure 9:
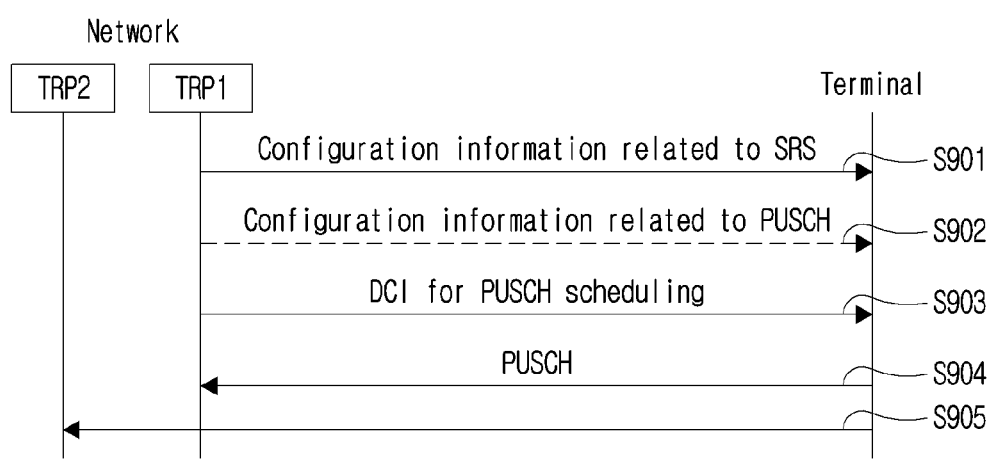
FIG. 9 is a diagram illustrating a signaling procedure between a network and a terminal for a method of transmitting and receiving a PUSCH according to an embodiment of the present disclosure.

FIG. 9 is a diagram illustrating a signaling procedure between a network and a terminal for a method of transmitting and receiving a PUSCH according to an embodiment of the present disclosure.

FIG. 9 represents signaling between a network (e.g., TRP 1/TRP 2) and a UE in a situation of multi-TRPs (i.e., M-TRPs, or multiple cells, hereinafter, all TRPs may be replaced with a cell) that methods proposed in the present disclosure (e.g., proposal 1/2/3/4, etc.) may be applied (Here, a UE/a network is just an example, and may be applied by being substituted with a variety of devices as described in FIG. 12 and FIG. 13). FIG. 9 is just for convenience of a description, and does not limit a scope of the present disclosure.

In reference to FIG. 9, for convenience of a description, signaling between 2 TRPs and a UE is considered, but it goes without saying that a corresponding signaling method may be extended and applied to signaling between a plurality of TRPs and a plurality of UEs. In the following description, a network may be one base station including a plurality of TRPs or may be one cell including a plurality of TRPs. In an example, an ideal/a non-ideal backhaul may be configured between TRP 1 and TRP 2 configuring a network. In addition, the following description is described based on a plurality of TRPs, but it may be equally extended and applied to transmission through a plurality of panels. In addition, in the present disclosure, an operation that a terminal receives a signal from TRP1/TRP2 may be interpreted/described (or may be an operation) as an operation that a terminal receives a signal from a network (through/with TRP1/2) and an operation that a terminal transmits a signal to TRP1/TRP2 may be interpreted/described (or may be an operation) as an operation that a terminal transmits a signal to a network (through/with TRP1/TRP2) or may be conversely interpreted/described.

A UE may receive SRS-related configuration information through/with TRP1 and/or TRP2 from a network S901.

Here, the SRS-related configuration information may be transmitted to a higher layer (e.g., RRC or MAC CE). In addition, when the SRS-related configuration information is predefined or preconfigured, a corresponding step may be omitted.

According to the method 1, SRS-related configuration information may include information on a plurality of SRS resource sets corresponding to each TRP. Here, the plurality of SRS resource sets may i) include only SRS resource sets for a codebook or ii) include only SRS resource sets for a non-codebook or iii) include one or more SRS resource sets for a codebook and one or more SRS resource sets for a non-codebook.

In addition, according to the method 2, SRS-related configuration information may include information on a plurality of SRS resources corresponding to each TRP (e.g., in one SRS resource set). Here, the plurality of SRS resources may i) include only SRS resources for a codebook or ii) include only SRS resources for a non-codebook or iii) include one or more SRS resources for a codebook and one or more SRS resources for a non-codebook.

In addition, according to the embodiment 1, SRS-related configuration information may include a reception cell ID (or a TRP ID) for an SRS resource set. In addition, it may include a reception cell ID (or a TRP ID) for an SRS resource.

In addition, according to the embodiment 4, SRS-related configuration information may include a parameter configuration related to transmission of multiple PUSCH TOs (a TA, a Tx beam, a PC parameter, a precoder, an MCS, etc.).

Not shown in FIG. 9, but a terminal may transmit an SRS towards a different TRP per SRS resource set based on configuration information received in S901 and in addition, may transmit an SRS towards a different TRP per SRS resource.

A UE may receive configuration information related to PUSCH transmission through/with TRP1 and/or TRP2 from a Network S902.

Here, configuration information related to PUSCH transmission may be transmitted to a higher layer (e.g., RRC or MAC CE). In addition, when configuration information related to PUSCH transmission is predefined or preconfigured, a corresponding step may be omitted.

According to the embodiment 2, as a M-TRP PUSCH configuration (e.g., m-trpPUSCH' or 'hybrid') is defined as one of UL transmission modes, configuration information related to PUSCH transmission may include a M-TRP PUSCH configuration. The M-TRP PUSCH configuration (e.g., m-trpPUSCH' or 'hybrid') may mean a transmission mode that transmission is performed based on a plurality of SRS resource sets or a plurality of SRS resources.

In addition, according to the embodiment 4, configuration information related to PUSCH transmission may include a parameter configuration related to transmission of multiple PUSCH TOs (a TA, a Tx beam, a PC parameter, a precoder, an MCS, etc.).

A terminal may receive DCI for PUSCH scheduling through/with TRP 1 (and/or TRP 2) from a network S903.

Here, DCI for PUSCH scheduling may include scheduling information for PUSCH transmission in N (N is a natural number) TOs for M-TRPs.

In addition, DCI for PUSCH scheduling may include a single SRI field. Alternatively, there are a plurality of SRI fields in corresponding DCI, but a specific codepoint configuring a corresponding SRI field to be disabled/off may be indicated by any one SRI field of them.

Here, according to the embodiment 2, DCI for PUSCH scheduling may be transmitted in a CORESET and/or a search space set that a PUSCH is configured to be transmitted based on a plurality of SRS resource sets (or a plurality of SRS resources) (i.e., configured for M-TRP PUSCH transmission). In addition, DCI for PUSCH scheduling may be transmitted based on a DCI format and/or a RNTI that a PUSCH is configured/defined to be transmitted based on a plurality of SRS resource sets (or a plurality of SRS resources) (i.e., configured/defined for M-TRP PUSCH transmission).

Here, according to the embodiment 3, DCI for PUSCH scheduling may include scheduling information on transmission of multiple PUSCHs towards a single TRP or multiple TRPs in N (N is a natural number) TOs of a PUSCH (e.g., repetition transmission of a PUSCH or partition transmission of a PUSCH).

In addition, according to the embodiment 4, DCI for PUSCH scheduling may include precoder information (e.g., a TPMI, an SRI field) and/or MCS indication information on transmission of multiple PUSCHs towards a single TRP or multiple TRPs in N (N is a natural number) TOs. In addition, according to whether a transmission mode that the PUSCH is transmitted based on the plurality of SRS resource sets (i.e., a M-TRP PUSCH transmission mode) is enabled, a configuration on a codepoint of the SRI field may be differently defined.

A terminal may transmit a PUSCH based on DCI to a single TRP or multiple TRPs (i.e., TRP 1 and 2) S904, S905.

Here, a PUSCH may be transmitted in N (N is a natural number) TOs (transmission occasion). As described above, a PUSCH may be alternatively (i.e., circularly, sequentially) transmitted to each TRP per each TO. Alternatively, a plurality of adjacent TOs may be grouped and a PUSCH may be alternatively (i.e., circularly, sequentially) transmitted to each TRP per each TO group.

Here, according to the embodiments, in each TO (or each TO group), the PUSCH may be transmitted based on an SRS resource in one SRS resource set identified by one SRI field of the plurality of SRI fields related to the each TO (or each TO group). Specifically, a power control parameter for transmission of the PUSCH and/or a reference signal referred to for transmission of the PUSCH for each TO (or each TO group) may be determined based on an SRS resource set configuration related to the each TO (or each TO group).

In addition, according to the embodiments, a power control parameter for transmission of the PUSCH and/or a reference signal referred to for transmission of the PUSCH for each TO (or each TO group) may be indicated by the SRI field related to the each TO (or each TO group).

In addition, according to the embodiments, a precoder for transmission of the PUSCH for each TO (or each TO group) may be determined based on a TPMI field in the DCI or an SRI field related to the each TO (or each TO group).

In addition, the PUSCH for the each TO may be transmitted based on an SRS resource in an SRS resource set identified by one SRI field which is enabled among the plurality of SRI fields related to the each TO.

It is not specifically described in a description on FIG. 9, but a description in the embodiment 1, 2, 3, 4 may be applied to an operation of FIG. 9.

As described above, the above-described Network/UE signaling and operation (e.g., embodiment 1/2/3/4, FIG. 9, etc.) may be implemented by a device (e.g., FIG. 12 and FIG. 13) which will be described below. For example, a Network (e.g., TRP 1/TRP 2) may correspond to a first wireless device and a UE may correspond to a second wireless device and in some cases, the opposite may be also considered.

Figure 12:
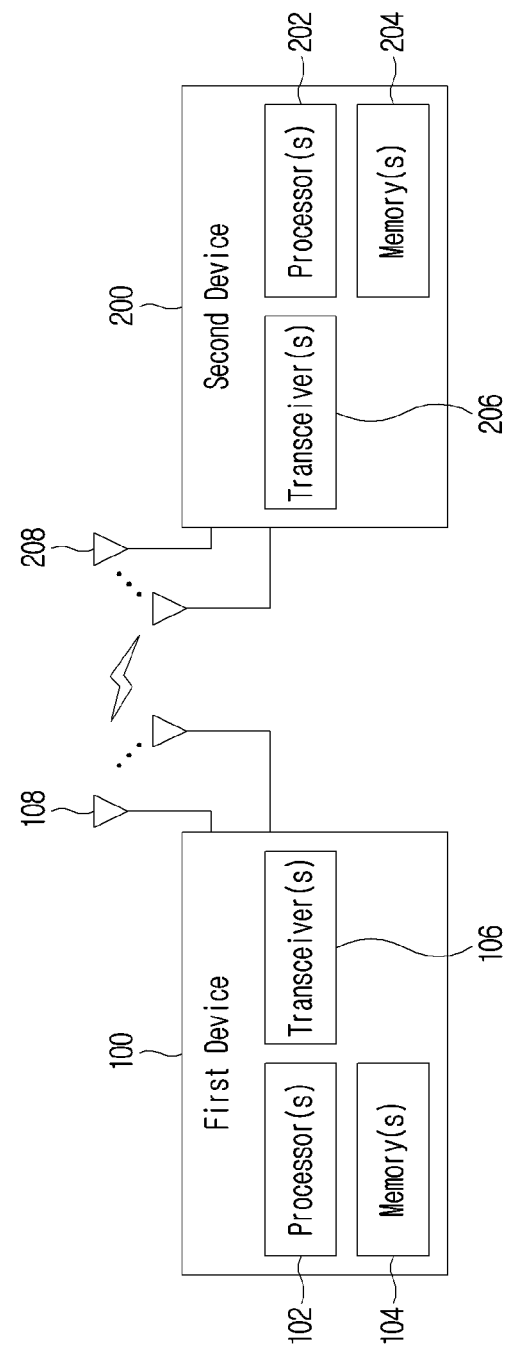
FIG. 12 illustrates a block diagram of a wireless communication system according to an embodiment of the present disclosure.
Figure 13:
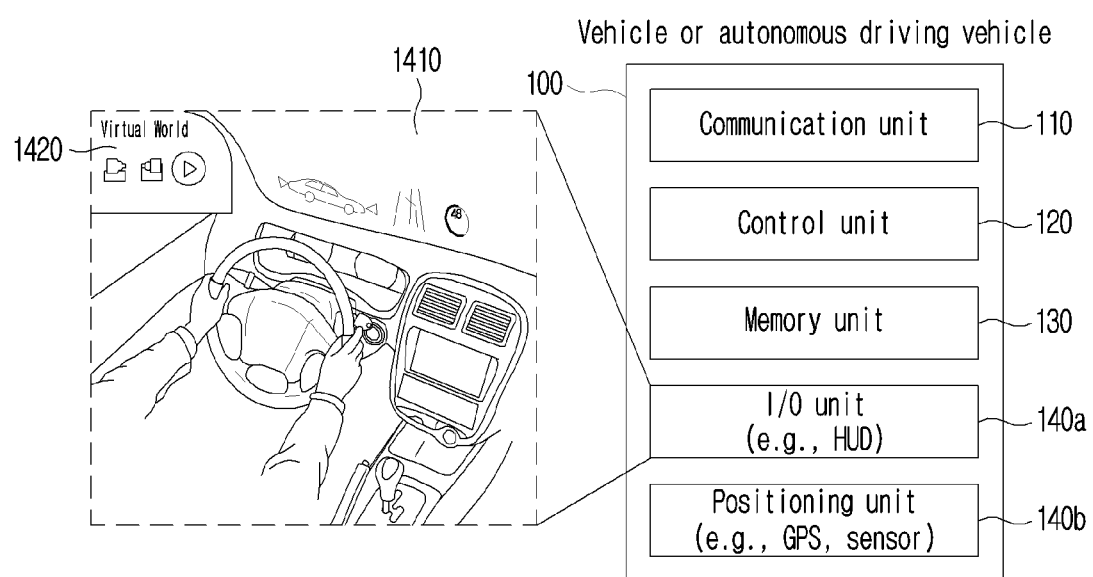
FIG. 13 illustrates a vehicle device according to an embodiment of the present disclosure.

For example, the above-described Network/UE signaling and operation (e.g., embodiment 1/2/3/4, FIG. 9, etc.) may be processed by one or more processors (102, 202) in FIG. 12 and FIG. 13. In addition, the above-described Network/UE signaling and operation (e.g., embodiment 1/2/3/4, FIG. 9, etc.) may be stored in a memory (e.g., one or more memories (104, 204) of FIG. 12 and FIG. 13) in a form of a command/a program (e.g., an instruction, an executable code) for operating at least one processor (e.g., 102, 202) of FIG. 12 and FIG. 13.

Figure 10:
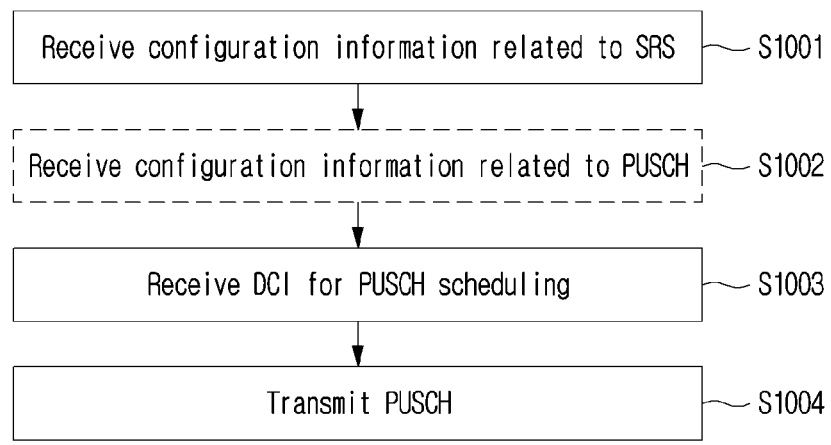
FIG. 10 is a diagram illustrating an operation of a terminal for a method of transmitting a PUSCH according to an embodiment of the present disclosure.

FIG. 10 is a diagram illustrating an operation of a terminal for a method of transmitting a PUSCH according to an embodiment of the present disclosure.

FIG. 10 illustrates an operation of a terminal based on the embodiment 1 to embodiment 4. An example in FIG. 10 is for convenience of a description, and it does not limit a scope of the present disclosure. Some step(s) illustrated in FIG. 10 may be omitted according to a situation and/or a configuration. In addition, a terminal is just one example in FIG. 10, and may be implemented by a device illustrated in the following FIG. 12 and FIG. 13. For example, a processor (102/202) in FIG. 12 and FIG. 13 may be controlled to transmit and receive a channel/a signal/data/information, etc. by using a transceiver (106/206) and may be controlled to store a channel/a signal/data/information, etc. which will be transmitted or received in a memory (104/204).

In addition, an operation of FIG. 10 may be processed by one or more processors (102, 202) in FIG. 12 and FIG. 13. In addition, an operation of FIG. 10 may be stored in a memory (e.g., one or more memories (104, 204) of FIG. 12 and FIG. 13) in a form of a command/a program (e.g., an instruction, an executable code) for operating at least one processor (e.g., 102, 202) of FIG. 12 and FIG. 13.

A terminal receives SRS-related configuration information (first configuration information) from a base station S1001.

Here, the SRS-related configuration information may be transmitted to a higher layer (e.g., RRC or MAC CE). In addition, when the SRS-related configuration information is predefined or preconfigured, a corresponding step may be omitted.

According to the method 1, SRS-related configuration information may include information on a plurality of SRS resource sets corresponding to each TRP. Here, the plurality of SRS resource sets may i) include only SRS resource sets for a codebook or ii) include only SRS resource sets for a non-codebook or iii) include one or more SRS resource sets for a codebook and one or more SRS resource sets for a non-codebook.

In addition, according to the method 2, SRS-related configuration information may include information on a plurality of SRS resources corresponding to each TRP (e.g., in one SRS resource set). Here, the plurality of SRS resources may i) include only SRS resources for a codebook or ii) include only SRS resources for a non-codebook or iii) include one or more SRS resources for a codebook and one or more SRS resources for a non-codebook.

In addition, according to the embodiment 1, SRS-related configuration information may include a reception cell ID (or a TRP ID) for an SRS resource set. Alternatively, it may include a reception cell ID (or a TRP ID) for an SRS resource.

In addition, according to the embodiment 4, SRS-related configuration information may include a parameter configuration related to transmission of multiple PUSCH TOs (a TA, a Tx beam, a PC parameter, a precoder, an MCS, etc.).

Not shown in FIG. 10, but a terminal may transmit an SRS towards a different TRP per SRS resource set based on configuration information received in S1001 and in addition, may transmit an SRS towards a different TRP per SRS resource.

A terminal may receive configuration information related to PUSCH transmission (second configuration information) from a base station S1002.

Here, configuration information related to PUSCH transmission may be transmitted to a higher layer (e.g., RRC or MAC CE). In addition, when configuration information related to PUSCH transmission is predefined or preconfigured, a corresponding step may be omitted.

According to the embodiment 2, as a M-TRP PUSCH configuration (e.g., m-trpPUSCH' or 'hybrid') is defined as one of UL transmission modes, configuration information related to PUSCH transmission may include a M-TRP PUSCH configuration. The M-TRP PUSCH configuration (e.g., m-trpPUSCH' or 'hybrid') may mean a transmission mode that transmission is performed based on a plurality of SRS resource sets or a plurality of SRS resources.

In addition, according to the embodiment 4, configuration information related to PUSCH transmission may include a parameter configuration related to transmission of multiple PUSCH TOs (a TA, a Tx beam, a PC parameter, a precoder, an MCS, etc.).

A terminal receives DCI for PUSCH scheduling from a base station S1003.

Here, DCI for PUSCH scheduling may include scheduling information for PUSCH transmission at N (N is a natural number) TOs for M-TRPs.

In addition, DCI for PUSCH scheduling may include a single SRI field. Alternatively, there are a plurality of SRI fields in corresponding DCI, but a specific codepoint configuring a corresponding SRI field to be disabled/off may be indicated by any one SRI field of them.

Here, according to the embodiment 2, DCI for PUSCH scheduling may be transmitted in a CORESET and/or a search space set that a PUSCH is configured to be transmitted based on a plurality of SRS resource sets (or a plurality of SRS resources) (i.e., configured for M-TRP PUSCH transmission). In addition, DCI for PUSCH scheduling may be transmitted based on a DCI format and/or a RNTI that a PUSCH is configured/defined to be transmitted based on a plurality of SRS resource sets (or a plurality of SRS resources) (i.e., configured/defined for M-TRP PUSCH transmission).

Here, according to the embodiment 3, DCI for PUSCH scheduling may include scheduling information on transmission of multiple PUSCHs towards a single TRP or multiple TRPs at N (N is a natural number) TOs of a PUSCH (e.g., repetition transmission of a PUSCH or partition transmission of a PUSCH).

In addition, according to the embodiment 4, DCI for PUSCH scheduling may include precoder information (e.g., a TPMI, an SRI field) and/or MCS indication information on transmission of multiple PUSCHs towards a single TRP or multiple TRPs at N (N is a natural number) TOs. In addition, according to whether a transmission mode that the PUSCH is transmitted based on the plurality of SRS resource sets (i.e., a M-TRP PUSCH transmission mode) is enabled, a configuration on a codepoint of the SRI field may be differently defined.

A terminal transmits a PUSCH to a base station S1004.

Here, a PUSCH may be transmitted at N (N is a natural number) TOs (transmission occasion). As described above, a PUSCH may be alternatively (i.e., circularly, sequentially) transmitted to each TRP per each TO. Alternatively, a plurality of adjacent TOs may be grouped and a PUSCH may be alternatively (i.e., circularly, sequentially) transmitted to each TRP per each TO group.

Here, according to the embodiments, for each TO (or each TO group), the PUSCH may be transmitted based on an SRS resource in one SRS resource set identified by one SRI field of the plurality of SRI fields related to the each TO (or each TO group). Specifically, a power control parameter for transmission of the PUSCH and/or a reference signal referred to for transmission of the PUSCH for each TO (or each TO group) may be determined based on an SRS resource set configuration related to the each TO (or each TO group).

In addition, according to the embodiments, a power control parameter for transmission of the PUSCH and/or a reference signal referred to for transmission of the PUSCH for each TO (or each TO group) may be indicated by the SRI field related to the each TO (or each TO group).

In addition, according to the embodiments, a precoder for transmission of the PUSCH for each TO (or each TO group) may be determined based on a TPMI field in the DCI or an SRI field related to the each TO (or each TO group).

In addition, the PUSCH for the each TO may be transmitted based on an SRS resource in an SRS resource set identified by one SRI field which is enabled among the plurality of SRI fields related to the each TO.

It is not specifically described in a description on FIG. 10, but a description in the embodiment 1, 2, 3, 4 may be applied to an operation of FIG. 10.

Figure 11:
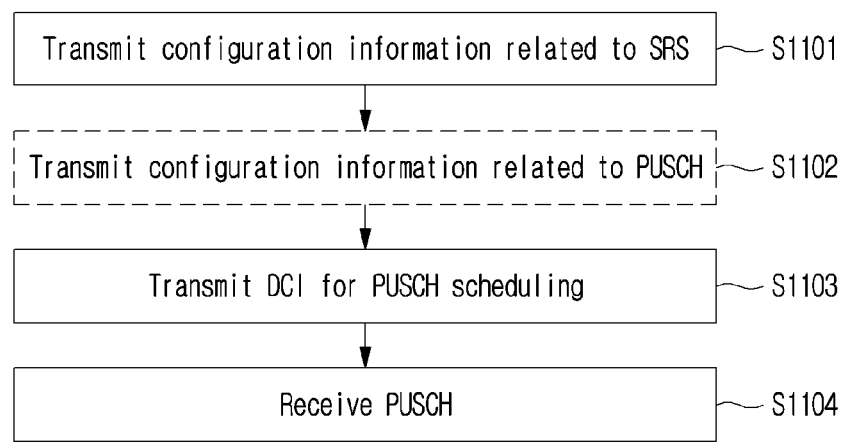
FIG. 11 is a diagram illustrating an operation of a base station for a method of transmitting a PUSCH according to an embodiment of the present disclosure.

FIG. 11 is a diagram illustrating an operation of a base station for a method of transmitting a PUSCH according to an embodiment of the present disclosure.

FIG. 11 illustrates an operation of a base station based on the embodiment 1 to embodiment 4. An example in FIG. 11 is for convenience of a description, and it does not limit a scope of the present disclosure. Some step(s) illustrated in FIG. 11 may be omitted according to a situation and/or a configuration. In addition, a base station is just one example in FIG. 11 and may be implemented by a device illustrated in the following FIG. 12. For example, a processor 102/202 in FIG. 12 may be controlled to transmit and receive a channel/a signal/data/information, etc. by using a transceiver 106/206 and may be controlled to store a channel/a signal/data/information, etc. which will be transmitted or received in a memory 104/204.

In addition, an operation of FIG. 11 may be processed by one or more processors 102 and 202 in FIG. 12. In addition, an operation of FIG. 11 may be stored in a memory (e.g., one or more memories 104 and 204 of FIG. 12) in a form of a command/a program (e.g., an instruction, an executable code) for operating at least one processor of FIG. 12 (e.g., 102, 202).

A base station transmits SRS-related configuration information (first configuration information) to a terminal S1101.

Here, the SRS-related configuration information may be transmitted to a higher layer (e.g., RRC or MAC CE). In addition, when the SRS-related configuration information is predefined or preconfigured, a corresponding step may be omitted.

According to the method 1, SRS-related configuration information may include information on a plurality of SRS resource sets corresponding to each TRP. Here, the plurality of SRS resource sets may i) include only SRS resource sets for a codebook or ii) include only SRS resource sets for a non-codebook or iii) include one or more SRS resource sets for a codebook and one or more SRS resource sets for a non-codebook.

In addition, according to the method 2, SRS-related configuration information may include information on a plurality of SRS resources corresponding to each TRP (e.g., in one SRS resource set). Here, the plurality of SRS resources may i) include only SRS resources for a codebook or ii) include only SRS resources for a non-codebook or iii) include one or more SRS resources for a codebook and one or more SRS resources for a non-codebook.

In addition, according to the embodiment 1, SRS-related configuration information may include a reception cell ID (or a TRP ID) for an SRS resource set. Alternatively, it may include a reception cell ID (or a TRP ID) for an SRS resource.

In addition, according to the embodiment 4, SRS-related configuration information may include a parameter configuration related to transmission of multiple PUSCH TOs (a TA, a Tx beam, a PC parameter, a precoder, a MCS, etc.).

Not shown in FIG. 11, but a base station may receive an SRS in an SRS resource set or an SRS resource from a terminal.

A base station may transmit configuration information related to PUSCH transmission (second configuration information) to a terminal S1102.

Here, configuration information related to PUSCH transmission may be transmitted to a higher layer (e.g., RRC or MAC CE). In addition, when configuration information related to PUSCH transmission is predefined or preconfigured, a corresponding step may be omitted.

According to the embodiment 2, as a M-TRP PUSCH configuration (e.g., m-trpPUSCH' or 'hybrid') is defined as one of UL transmission modes, configuration information related to PUSCH transmission may include a M-TRP PUSCH configuration. The M-TRP PUSCH configuration (e.g., m-trpPUSCH' or 'hybrid') may mean a transmission mode that transmission is performed based on a plurality of SRS resource sets or a plurality of SRS resources.

In addition, according to the embodiment 4, configuration information related to PUSCH transmission may include a parameter configuration related to transmission of multiple PUSCH TOs (a TA, a Tx beam, a PC parameter, a precoder, an MCS, etc.).

A base station transmits DCI for PUSCH scheduling to a terminal S1103.

Here, DCI for PUSCH scheduling may include scheduling information for PUSCH transmission at N (N is a natural number) TOs for M-TRPs.

In addition, DCI for PUSCH scheduling may include a single SRI field. Alternatively, there are a plurality of SRI fields in corresponding DCI, but a specific codepoint configuring a corresponding SRI field to be disabled/off may be indicated by any one SRI field of them.

Here, according to the embodiment 2, DCI for PUSCH scheduling may be transmitted in a CORESET and/or a search space set that a PUSCH is configured to be transmitted based on a plurality of SRS resource sets (or a plurality of SRS resources) (i.e., configured for M-TRP PUSCH transmission). In addition, DCI for PUSCH scheduling may be transmitted based on a DCI format and/or a RNTI that a PUSCH is configured/defined to be transmitted based on a plurality of SRS resource sets (or a plurality of SRS resources) (i.e., configured/defined for M-TRP PUSCH transmission).

Here, according to the embodiment 3, DCI for PUSCH scheduling may include scheduling information on transmission of multiple PUSCHs towards a single TRP or multiple TRPs at N (N is a natural number) TOs of a PUSCH (e.g., repetition transmission of a PUSCH or partition transmission of a PUSCH).

In addition, according to the embodiment 4, DCI for PUSCH scheduling may include precoder information (e.g., a TPMI, an SRI field) and/or MCS indication information on transmission of multiple PUSCHs towards a single TRP or multiple TRPs at N (N is a natural number) TOs. In addition, according to whether a transmission mode that the PUSCH is transmitted based on the plurality of SRS resource sets (i.e., a M-TRP PUSCH transmission mode) is enabled, a configuration on a codepoint of the SRI field may be differently defined.

A base station receives a PUSCH from a terminal S1104.

Here, a PUSCH may be transmitted at N (N is a natural number) TOs (transmission occasion). As described above, a PUSCH may be alternatively (i.e., circularly, sequentially) transmitted to each TRP per each TO. Here, when a base station is a single TRP, the base station may receive a PUSCH in a TO corresponding to itself. Alternatively, a plurality of adjacent TOs may be grouped and a PUSCH may be alternatively (i.e., circularly, sequentially) transmitted to each TRP per each TO group. Here, when a base station is a single TRP, the base station may receive a PUSCH in a TO group corresponding to itself.

Here, according to the embodiments, for each TO (or each TO group), the PUSCH may be transmitted based on an SRS resource in one SRS resource set identified by one SRI field of the plurality of SRI fields related to the each TO (or each TO group). Specifically, a power control parameter for transmission of the PUSCH and/or a reference signal referred to for transmission of the PUSCH for each TO (or each TO group) may be determined based on an SRS resource set configuration related to the each TO (or each TO group).

In addition, according to the embodiments, a power control parameter for transmission of the PUSCH and/or a reference signal referred to for transmission of the PUSCH for each TO (or each TO group) may be indicated by the SRI field related to the each TO (or each TO group).

In addition, according to the embodiments, a precoder for transmission of the PUSCH for each TO (or each TO group) may be determined based on a TPMI field in the DCI or an SRI field related to the each TO (or each TO group).

In addition, the PUSCH for each TO may be transmitted based on an SRS resource in an SRS resource set identified by one SRI field which is enabled among the plurality of SRI fields related to the each TO.

It is not specifically described in a description on FIG. 11, but a description in the embodiment 1, 2, 3, 4 may be applied to an operation of FIG. 11.

General Device to which the Present Disclosure May be Applied

FIG. 12 is a diagram which illustrates a block diagram of a wireless communication device according to an embodiment of the present disclosure.

In reference to FIG. 12, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102.

For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

FIG. 13 illustrates a vehicle device according to an embodiment of the present disclosure.

In reference to FIG. 13, a vehicle 100 may include a communication unit 110, a control unit 120, a memory unit 130, an input and output unit 140*a* and a positioning unit 140*b*.

A communication unit 110 may transmit and receive a signal (e.g., data, a control signal, etc.) with external devices of other vehicle, or a base station, etc. A control unit 120 may perform a variety of operations by controlling elements of a vehicle 100. A control unit 120 may control a memory unit 130 and/or a communication unit 110 and may be configured to implement descriptions, functions, procedures, proposals, methods and/or operation flow charts included in the present disclosure. A memory unit 130 may store data/a parameter/a program/a code/a command supporting a variety of functions of a vehicle 100. An input and output unit 140*a* may output an AR/VR object based on information in a memory unit 130. An input and output unit 140*a* may include HUD. A positioning unit 140*b* may obtain position information of a vehicle 100. Position information may include absolute position information, position information in a driving lane, acceleration information, position information with a surrounding vehicle, etc. of a vehicle 100. A positioning unit 140*b* may include a GPS and a variety of sensors.

In an example, a communication unit 110 of a vehicle 100 may receive map information, traffic information, etc. from an external server and store them in a memory unit 130. A positioning unit 140*b* may obtain vehicle position information through a GPS and a variety of sensors and store it in a memory unit 130. A control unit 120 may generate a virtual object based on map information, traffic information and vehicle position information, etc. and an input and output unit 140*a* may indicate a generated virtual object on a window in a vehicle 1410, 1420. In addition, a control unit 120 may determine whether a vehicle 100 normally operates in a driving lane based on vehicle position information. When a vehicle 100 is abnormally out of a driving lane, a control unit 120 may indicate a warning on a window in a vehicle through an input and output unit 140*a*. In addition, a control unit 120 may send a warning message on abnormal driving to surrounding vehicles through a communication unit 110. According to a situation, a control unit 120 may transmit position information of a vehicle and information on a driving/vehicle problem to a relative agency through a communication unit 110.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other nonvolatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL AVAILABILITY

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method comprising:
 receiving, by a terminal, from a base station, first configuration information related to a sounding reference signal (SRS), wherein the first configuration information includes information on a plurality of SRS resource sets;
 receiving, by the terminal, from the base station, downlink control information (DCI) for scheduling a PUSCH (physical uplink shared channel); and
 transmitting, by the terminal, to the base station, the PUSCH based on the DCI,
 wherein the DCI includes a plurality of SRS resource indicator (SRI) fields and each of the plurality of SRI fields is related to each of the plurality of SRS resource sets, respectively,
 wherein the PUSCH is repeatedly transmitted at N (N is an integer greater than 1) transmission occasions (TOs),
 wherein the N TOs are grouped into TO groups of a plurality of continuous TOs,
 wherein the plurality of the SRS resource sets are respectively mapped to each of the TO groups based on a mapping relation, and
 wherein one SRI field among the plurality of SRI fields is applied to the PUSCH for each of the TO groups, based on one SRS resource set mapped to each of the TO groups.

2. The method of claim 1, further including:
 receiving, by the terminal, from the base station, second configuration information related to the PUSCH,
 wherein a transmission mode that the PUSCH is transmitted based on the plurality of SRS resource sets is configured by the second configuration information.

3. The method of claim 1, wherein the DCI is transmitted in a control resource set (CORESET) and/or a search space set that the PUSCH is configured to be transmitted based on the plurality of SRS resource sets.

4. The method of claim 1, wherein the DCI is transmitted based on a RNTI (Radio Network Temporary Identifier) and/or a DCI format that the PUSCH is configured to be transmitted based on the plurality of SRS resource sets.

5. The method of claim 1, wherein a power control parameter for transmission of the PUSCH and/or a reference signal referred to for transmission of the PUSCH for each of the TO groups is determined based on an SRS resource set related to each of the TO groups.

6. The method of claim 1, wherein a power control parameter for transmission of the PUSCH and/or a reference signal referred to for transmission of the PUSCH for each of the TO groups is indicated by an SRI field related to each of the TO groups.

7. The method of claim 1, wherein a precoder for transmission of the PUSCH for each of the TO groups is determined based on a transmit precoding matrix indicator (TPMI) field in the DCI or an SRI field related to each of the TO groups.

8. The method of claim 1, wherein based on a transmission mode that the PUSCH is transmitted based on the plurality of SRS resource sets, a configuration on a codepoint of the SRI field is configured.

9. The method of claim 1, wherein the one SRI field which is activated among the plurality of SRI fields is applied to the PUSCH for each of the TO groups.

10. The method of claim 1, wherein the plurality of SRS resource sets i) include only SRS resource sets for codebook based uplink transmission or ii) include only SRS resource sets for non-codebook based uplink transmission.

11. A terminal comprising:
 at least one transceiver for transmitting and receiving a wireless signal; and
 at least one processor for controlling the at least one transceiver,
 wherein the at least one processor configured to:
 receive, from a base station, first configuration information related to a sounding reference signal (SRS), wherein the first configuration information includes information on a plurality of SRS resource sets;
 receive, from the base station, downlink control information (DCI) for scheduling a PUSCH (physical uplink shared channel); and
 transmit, to the base station, the PUSCH based on the DCI,
 wherein the DCI includes a plurality of SRS resource indicator (SRI) fields and each of the plurality of SRI fields is related to each of the plurality of SRS resource sets, respectively,
 wherein the PUSCH is repeatedly transmitted at N (N is an integer greater than 1) transmission occasions (TOs),
 wherein the N TOs are grouped into TO groups of a plurality of continuous TOs,
 wherein the plurality of the SRS resource sets are respectively mapped to each of the TO groups based on a mapping relation, and
 wherein one SRI field among the plurality of SRI fields is applied to the PUSCH for each of TO groups, based on one SRS resource set mapped to each of the TO groups.

12. A method comprising:
 transmitting, by a base station, to a terminal, first configuration information related to a sounding reference signal (SRS), wherein the first configuration information includes information on a plurality of SRS resource sets;
 transmitting, by the base station, to the terminal, downlink control information (DCI) for scheduling a PUSCH (physical uplink shared channel); and
 receiving, by the base station, from the terminal, the PUSCH, wherein the DCI includes a plurality of SRS resource indicator (SRI) fields and each of the plurality of SRI fields is related to each of the plurality of SRS resource sets, respectively, wherein the PUSCH is repeatedly transmitted at N (N is an integer greater than 1) transmission occasions (TOs), wherein the N TOs are grouped into TO groups of a plurality of continuous TOs, wherein the plurality of the SRS resource sets are respectively mapped to each of the TO groups based on a mapping relation, and wherein one SRI field among the plurality of SRI fields is applied to the PUSCH for each of the TO groups, based on one SRS resource set mapped to each of the TO groups.

* * * * *